US008587597B2

(12) United States Patent
Rhodes

(10) Patent No.: US 8,587,597 B2
(45) **Date of Patent: *Nov. 19, 2013**

(54) PAGE TRANSITIONS ON ELECTRONIC PAPER DISPLAYS

(75) Inventor: Bradley J. Rhodes, Alameda, CA (US)

(73) Assignee: Ricoh Co., Ltd., Tokyo (JP)

(*) Notice: Subject to any disclaimer, the term of this patent is extended or adjusted under 35 U.S.C. 154(b) by 806 days.

This patent is subject to a terminal disclaimer.

(21) Appl. No.: 12/574,456

(22) Filed: Oct. 6, 2009

(65) Prior Publication Data

US 2011/0080418 A1 Apr. 7, 2011

(51) Int. Cl.
*G09G 5/36* (2006.01)
*G09G 5/39* (2006.01)
*G06T 1/00* (2006.01)

(52) U.S. Cl.
USPC ............................ 345/522; 345/531; 345/545

(58) Field of Classification Search
None
See application file for complete search history.

(56) References Cited

U.S. PATENT DOCUMENTS 5,761,683 A * 6/1998 Logan et al. .................. 715/206
6,275,920 B1 * 8/2001 Abercrombie et al. ......... 712/14
6,943,773 B2 * 9/2005 Wong et al. ................... 345/156
7,012,600 B2 3/2006 Zehner et al.
7,119,772 B2 10/2006 Amundson et al.
2003/0061417 A1 * 3/2003 Craddock et al. ............... 710/54
2007/0085819 A1 4/2007 Zhou et al.
2007/0177208 A1 8/2007 McCall et al.
2008/0291129 A1 11/2008 Harris et al.
2008/0309636 A1 12/2008 Feng et al.
2008/0309648 A1 12/2008 Erol et al.
2008/0309674 A1 12/2008 Barrus et al.
2009/0219264 A1 9/2009 Erol et al.

FOREIGN PATENT DOCUMENTS

WO 2005101362 10/2005

* cited by examiner

*Primary Examiner* — Joni Richer
*Assistant Examiner* — Michelle Chin
(74) *Attorney, Agent, or Firm* — Patent Law Works LLP

(57) ABSTRACT

A page transition file creation system and a method for creating a page transition file in a file format suitable for displaying transitions quickly on an electronic paper display. The page transition file creation system creates a page transition file with page transition blocks representing transition between two or more pages. The page transition file creation system encodes the high order color bit from each pixel for a given page. Each transition block in the page transition file covers a set of consecutive pages that overlaps with pages covered by the previous block and the next block for pseudo double buffering. A page transition display system uses page transition files to display page transitions. The page transition display system determines the appropriate page transition file and waveform lookup table for displaying page transitions. The page transition display system uses the determined page transition file and waveform lookup table for displaying the transitions.

20 Claims, 24 Drawing Sheets

PAGE TRANSITIONS ON ELECTRONIC PAPER DISPLAYS

BACKGROUND OF THE INVENTION

1. Field of Art

The disclosure generally relates to the field of electronic paper displays. More particularly, the invention relates to systems and methods for displaying a page transition on electronic paper displays.

2. Description of the Related Art

Several technologies have been introduced recently that provide some of the properties of paper in a display that can be updated electronically. Some of the desirable properties of paper that this type of display tries to achieve include: low power consumption, flexibility, wide viewing angle, low cost, light weight, high resolution, high contrast and readability indoors and outdoors. Because these types of displays attempt to mimic the characteristics of paper, they are referred to as electronic paper displays (EPDs) in this application. Other names for this type of display include: paper-like displays, zero power displays, e-paper and bi-stable displays.

A comparison of EPDs to Cathode Ray Tube (CRT) displays or Liquid Crystal Displays (LCDs) reveal that in general, EPDs require less power and have higher spatial resolution; but have the disadvantages of slower update rates, less accurate color control, and lower color resolution. Many electronic paper displays were previously only grayscale devices. Color EPDs are becoming available although often through the addition of a color filter, which tends to reduce the spatial resolution and the contrast.

The key feature that distinguishes EPDs from LCDs or CRTs is that EPDs can maintain an image without using power. They are sometimes referred to as "bi-stable" because black or white pixels can be displayed continuously and power is only needed to change from one state to another. However, some devices are stable at multiple states and thus support multiple colors without power consumption. EPDs are also typically reflective rather than transmissive. Thus they are able to use ambient light rather than requiring a lighting source in the device. Various technologies have been developed to produce EPDs. Depending on the technology used, such displays are sometimes called electrophoretic displays, electro-wetting displays, cholesteric LCD (Ch-LC). Techniques have also been developed to produce EPDs by embedding organic transistors into flexible substrates.

The luminance or color of a pixel in a traditional LCD display depends on the voltage currently being applied at the given point, with a given voltage reliably corresponding to a specific luminance. The luminance or color of a pixel in a bistable display, on the other hand, typically changes as voltage is applied. For example, in some bistable displays applying a negative voltage to a pixel makes it lighter (higher luminance) and a positive voltage makes it darker. The higher the voltage and the longer or more times that voltage is applied, the larger the change in luminance. This has two implications for driving such displays. First, electronic paper displays are typically controlled by applying a sequence of voltages to a pixel instead of just a single value like a typical LCD. These sequences of voltages are sometimes called waveforms. The second implication is that the control signals used to drive a pixel depend not only on the optical state the pixel is being driven to, but also on the optical state it is being driven from. Depending on the display technology, other factors may also need to be taken into consideration when choosing the waveform to drive a pixel to a desired color. Such factors can include the temperature of the display, optical state of the pixel prior to the current optical state, and dwell time (i.e. the time since the pixel was last driven). Failure to take these factors into account can lead to faint remnants of images that have supposedly been erased still being visible, a visual artifact known as ghosting. Some displays also have additional requirements that must be met to avoid damaging the display, such as the requirement that waveforms be DC balanced.

To handle these issues, some controllers for driving the displays are configured like an indexed color-mapped display. The framebuffer of these electronic paper displays includes an index to the waveform used to update that pixel instead of the waveform itself. Whenever the optical state of a pixel is to be changed, the index of the appropriate waveform is chosen based on at least some of the factors listed above, and the pixel's location in the frame buffer is set to that index. Some displays will encode some factors (such as a pixel's current and desired optical state) in the waveform index and then choose which waveform table to use when updating a set of pixels based on other factors (such as temperature).

One problem with the above technique is that it typically takes longer to compute which waveform to apply to a pixel than it does to perform the corresponding operation on a conventional CRT or LCD display. This can lead to a considerable latency between when an application requests a new image be displayed and when the image actually appears. For example, an EPD using a prior art controller can take on the order of half a second to calculate new pixel values for a 1200×825 display. The latency can be improved with faster or additional hardware, but only with increased cost and power consumption. To some extent the latency can also be reduced by simplifying the calculation, for example by ignoring secondary factors such as dwell time and pixel history (prior displayed colors for the pixel) prior to the current optical state, but this can result in increased ghosting.

While current update times are generally sufficient for the page turning needed by electronic books, they are problematic for interactive applications that emulate page transitions or page flipping at higher speeds. A user may tolerate waiting for a second or two for transitioning between two pages when the user spends a few minutes reading each page. However, when the user wants to flip through numerous pages successively without spending more than a few seconds on each page such as to find a section, illustration or particular part of a larger document, the transition time of half a second between pages becomes unacceptable.

There have been attempts in the prior art to solve page flipping problem described above in the previous paragraph. While those attempts approximate something like page transitions, they have certain shortcomings. One particular problem is that precise timing is required for the block copying of data such that the copying is ahead of the LCD controller. Managing this timing can be problematic if the processor is under heavy load for other activities. Another problem is that the needed data files for fast page flipping can be very large; for example, just under 1 MB per page for a display that is 1200×827 pixels. Finally, the prior art approaches required a block copy for each page transition. This means that writing about a megabyte to the frame buffer for each page transition, which translates to one megabyte every 80 ms for 12.5 pages per second transition rate. Thus there is a significant burden on computing resources that can be used for other applications.

SUMMARY OF THE INVENTION

The present invention includes a page transition file creation system and a method for creating a page transition file for displaying transitions quickly on an electronic paper display. The present invention also includes a page transition display system and a method for displaying page transitions using page transition files.

The page transition file creation system comprises an image buffer feeding module and a page transition block determination module. The page transition file creation system creates one or more page transition files corresponding to an input document for later displaying page transitions in different directions. The image buffer feeding module receives an input document, extracts image blocks representing document pages from the input document, and delivers the image blocks to page transition block determination module. The page transition block determination module converts the received input image blocks into a page transition file and stores the page transition file for later use. More specifically, the page transition block determination module encodes one or more high order color bits from each pixel for a given page. Each transition block in the page transition file covers a set of consecutive pages that overlaps with pages covered by the previous block and the next block to allow the system to render new pages to the display without causing visual artifacts via a method referred to herein as pseudo double buffering.

A page transition file comprises a header and one or more page transition blocks. The header of the page transition file comprises components such as H, CBITS, N, OVERLAP, and Num_Pix and values for these components. In one embodiment, the header includes the page width and height in pixels, and Num_Pix is calculated from these two values. H is the number of document pages represented in each page transition block. CBITS is the number of bits used to represent color of a pixel for a particular page in the page transition file. In an optimized embodiment, there is only one bit, CBITS=1, used to represent color of a pixel. N is the number of pages in the input document, and Num_Pix is the number of pixels in each page of the document. A page transition block represents a transition through H pages and comprises Num_Pix transition pixels, each transition pixel representing varying colors of an image pixel on H consecutive pages of the document. As noted above, each transition block represents a set of consecutive pages that overlaps with pages covered by the previous block and the next block for pseudo double buffering.

The page transition display system receives the page transition file and uses the information in page transition file to display page transitions on physical media. The page transition display system comprises an update controller, a frame buffer, a waveform buffer and a display controller.

The update controller determines the appropriate page transition file comprising the page transition blocks. In one embodiment, the update controller receives from an end user application page a request to flip through a particular document, transition direction, transition speed, CBITS and/or H and then retrieves or receives a page transition file corresponding to the received variable or variables. The update controller selects the appropriate page transition block from the page transition file and stores the selected page transition block in the frame buffer. The update controller also selects the appropriate waveform lookup table and stores a waveform lookup table to the waveform buffer. The update controller comprises a frame buffer controller and a waveform determination module. The frame buffer controller controls when the frame buffer is update and the content for the frame buffer. The waveform determination module determines and transmits to waveform buffer the waveform lookup tables corresponding to the transmitted page transition blocks, page transition speed and page transition direction. The waveform determination module comprises waveforms for transitioning a pixel color on physical media from one color to another.

The display controller uses the received page transition blocks and waveform lookup table to determine waveforms, applies the determined waveform to physical media, and drives the pixel colors on physical media to desired colors.

BRIEF DESCRIPTION OF THE DRAWINGS

The disclosed embodiments have other advantages and features which will be more readily apparent from the detailed description, the appended claims and the accompanying figures (or drawings).

Figure 1:
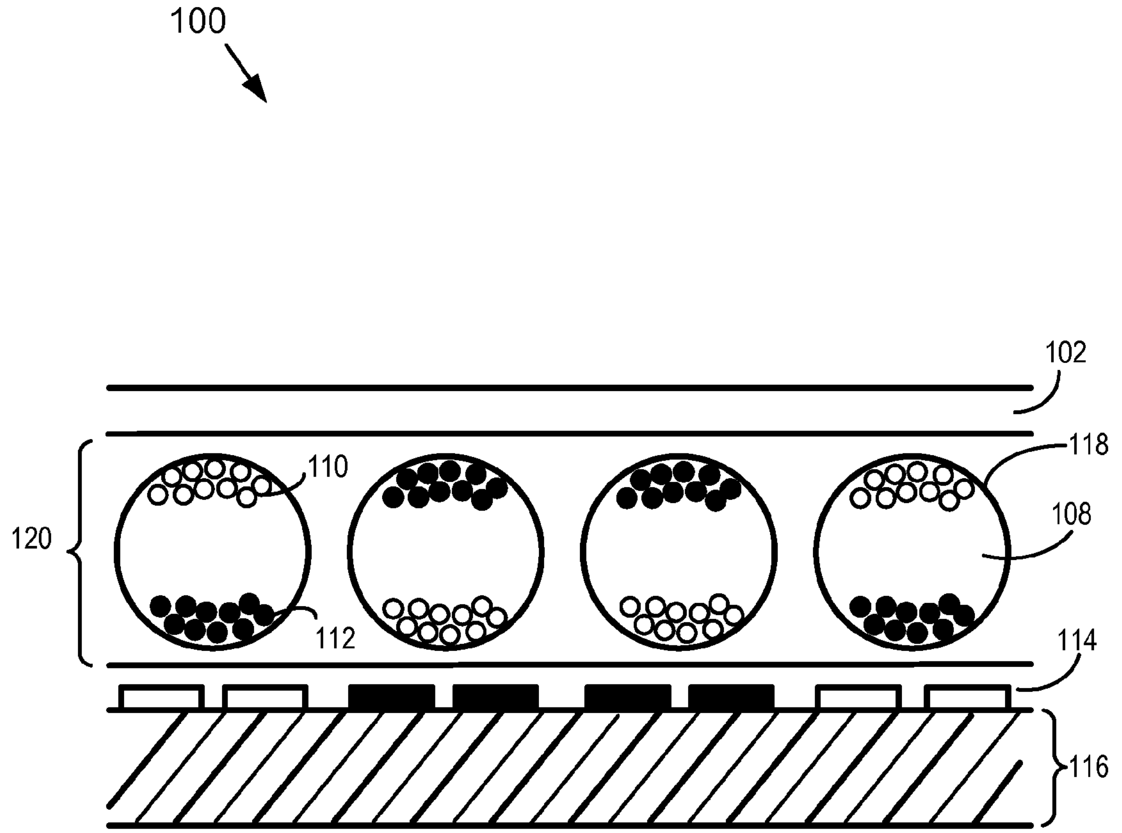
FIG. 1 (Prior Art)
FIG. 1 illustrates a cross-sectional view of a portion of an example prior art electronic paper display.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

A system and method for displaying page transitions on electronic paper display are described. The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As used herein any reference to "one embodiment," "an embodiment," or "some embodiments" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Also, some embodiments of the invention may be further divided into logical modules. One of ordinary skill in the art will understand that these modules can be implemented in hardware, firmware, and/or software. In one embodiment, the modules are implemented in form of computer instructions stored in a computer readable medium when executed by a processor cause the processor to implement the functionality of the module. Additionally, one of ordinary skill in the art will recognize that a computer or another machine with instructions to implement the functionality of one or more logical modules is not a general purpose computer. Instead, the machine is adapted to implement the functionality of a particular module. Moreover, the machine embodiment of the invention physically transforms the electrons representing the images in the document from one state to another in order to attain the desired format.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Device Overview

Figure (FIG.) 1 illustrates a cross-sectional view of a portion of an exemplary electronic paper display 100. The components of the electronic paper display 100 are sandwiched between a top transparent electrode 102 and a bottom backplane 116. The top transparent electrode 102 is a thin layer of transparent material. The top transparent electrode 102 allows for viewing of microcapsules 118 of the electronic paper display 100.

Directly beneath the top transparent electrode 102 is the microcapsule layer 120. In one embodiment, the microcapsule layer 120 includes closely packed microcapsules 118 having a clear fluid 108 and some black particles 112 and white particles 110. In some embodiments, the microcapsule 118 includes positively charged white particles 110 and negatively charged black particles 112. In other embodiments, the microcapsule 118 includes positively charged black particles 112 and negatively charged white particles 110. In yet other embodiments, the microcapsule 118 include colored particles of one polarity and different colored particles of the opposite polarity. In some embodiments, the top transparent electrode 102 includes a transparent conductive material such as indium tin oxide.

Disposed below the microcapsule layer 120 is a lower electrode layer 114. The lower electrode layer 114 is a network of electrodes used to drive the microcapsules 118 to a next optical state. The network of electrodes is connected to display circuitry, which turns the electronic paper display "on" and "off" at specific pixels by applying a voltage to specific electrodes. Applying a positive charge (black electrode 114) to the electrode repels the positively charged black particles 112 to the top of microcapsule 118, while drawing the negatively charged white particles 110 to the bottom and giving the pixel a black appearance. Reversing the voltage has the opposite effect—the negatively charged white particles 112 are forced to the surface, giving the pixel a white appearance. The luminance of a pixel in an EPD changes as voltage is applied. The amount the pixel's luminance changes may depend on both the amount of voltage and the length of time for which it is applied, with zero voltage leaving the pixel's luminance unchanged.

The electrophoretic microcapsules of the layer 120 may be individually or collectively activated to a next optical state, such as black, white or gray. In some embodiments, the next optical state may be any other prescribed color. Each pixel in layer 114 may be associated with one or more microcapsules 118 contained within a microcapsule layer 120. Each microcapsule 118 includes a plurality of tiny particles 110 and 112 that are suspended in a clear fluid 108. In some embodiments, the plurality of tiny particles 110 and 112 are suspended in a clear liquid polymer.

The lower electrode layer 114 is disposed on top of a backplane 116. In one embodiment, the electrode layer 114 is integral with the backplane layer 116. The backplane 116 is a plastic or ceramic backing layer. In other embodiments, the backplane 116 is a metal or glass backing layer. The electrode layer 114 includes an array of addressable pixel electrodes and supporting electronics.

Figure 2A:
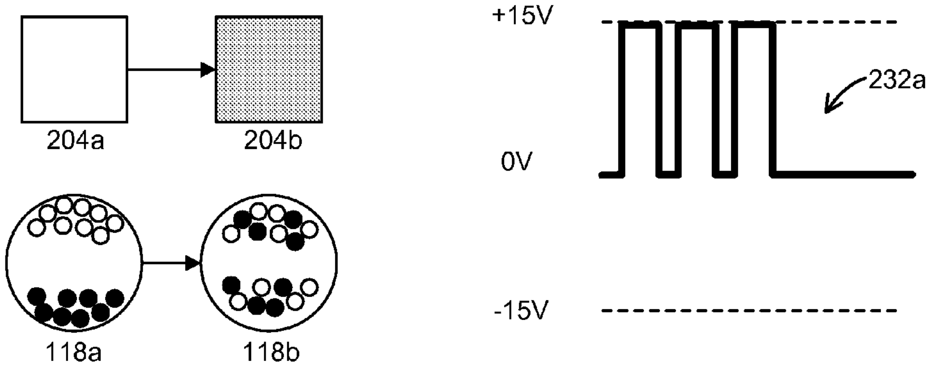
FIGS. 2A-2C illustrates the movement of white particles and black particles in a microcapsule of electronic paper display in response to applied waveform leading to change in color of a corresponding pixel.
Figure 2B:
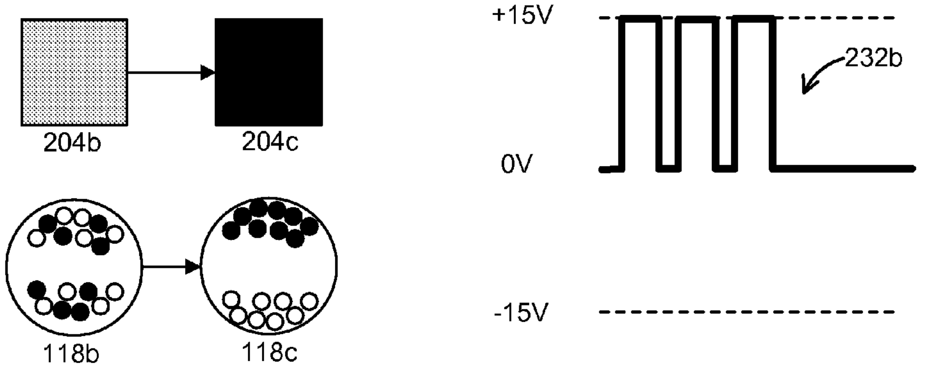
Figure 2C:
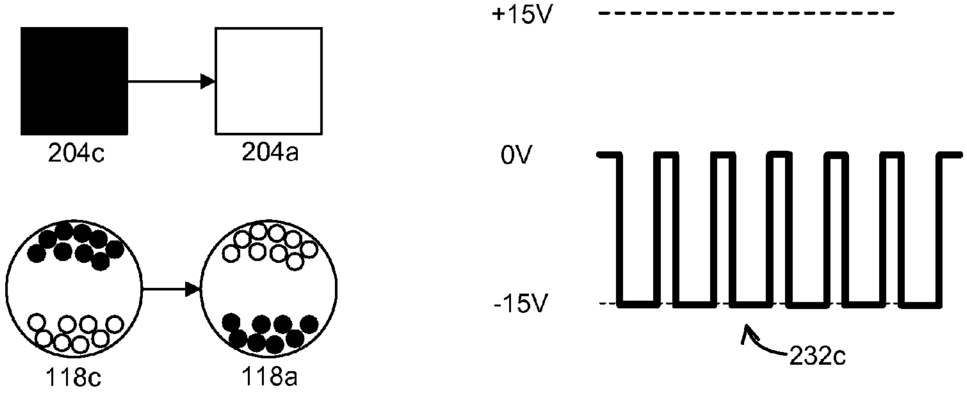

FIGS. 2A-2C illustrate the movement of white particles 110 and black particles 112 in microcapsule 118 of electronic paper display in response to the applied waveform leading to changes in color of a corresponding pixel. For clarity and ease of understanding, FIGS. 2A-2C do not display every physical layer of electronic paper display 100. FIGS. 2A-2C instead display examples of waveforms 232*a-c* that can be applied by electrode layer 114 to one or more microcapsules 118 and the resulting change in pixel color 204*a-c*. While this example uses 3 set voltages of +15V, 0V and −15V, those skilled in the art will recognize that various other sets of voltages could be used to drive the pixels such as of +15V, +10V, +5V, 0V, −5V, −10V or −15V for each frame.

FIG. 2A illustrates a change in position of white particles 110 and black particles 112 in microcapsule 118 when electrode layer 114 applies a waveform 232*a* including three frames of +15V. The application of such a waveform 232*a* leads to some of the positively charged black particles 112 to move away from the electrode layer 114 and closer to top transparent electrode 102. For similar reason, some of the negatively charged white particles 110 move towards the positively charged electrode layer 114 and away from the top transparent electrode 102. This movement of black and white particles 112, 110 leads to a mixture of black and white particles 112, 110 visible through the top transparent electrode 102. The visible mixture appears as a gray color 204*b* for a corresponding pixel. As discussed above, microcapsule 118 maintains this state or this gray color 204*b* until another waveform is applied to the microcapsule 118.

FIG. 2B illustrates electrode layer 114 applying another waveform 232*b* to microcapsule 118 after the microcapsule 118 has reached the gray color 204*b*. In this illustration, application of an additional waveform 232*b* including three frames of +15V to microcapsule 118 leads to the remaining negatively charged white particles to move towards the electrode layer 114 and the remaining positively charged black particles to move towards the transparent electrode 102. As a result, all the positively charged black particles are visible through the transparent electrode 102 and the pixel color changes from gray 204*b* to black 204*c*.

FIG. 2C illustrates an application of waveform 232*c* including six −15V frames to move all the positively charged black particles 112 close to electrode layer 114 and negatively charged white particles 110 close to transparent electrode 102. As a result, the visible color of the corresponding pixel changes from black 204*c* to white 204*a*.

As apparent from FIG. 2A-2C, six +15V frames change the pixel color from white 204*a* to black 204*c* and six −15V frames change the pixel color from black 204*c* to white 204*a*. In some embodiments, the waveform required to change the color from a first color to a second color may not be exact polar opposite of the waveform required to change the color from the second color back to the first color. In addition, waveforms may contain a mix of positive, negative or zero voltages.

Additionally, the waveform frames can each represent a time period like 20 milliseconds (ms) in one embodiment. Accordingly, the time required to change the pixel color from white 204*a* to black 204*c* is six frames or 120 ms. This time is usually acceptable to a reader watching the transition of pixels as the user flips through pages on an electronic paper display. However, it typically takes longer to compute which voltage or waveform to apply to a pixel than it does to perform the corresponding operation on an EPD. This lag can create a delay between transitions which are unacceptable to a reader and can be reduced by using an efficient file format explained below.

File Format with Page Transition Blocks

Figure 3A:
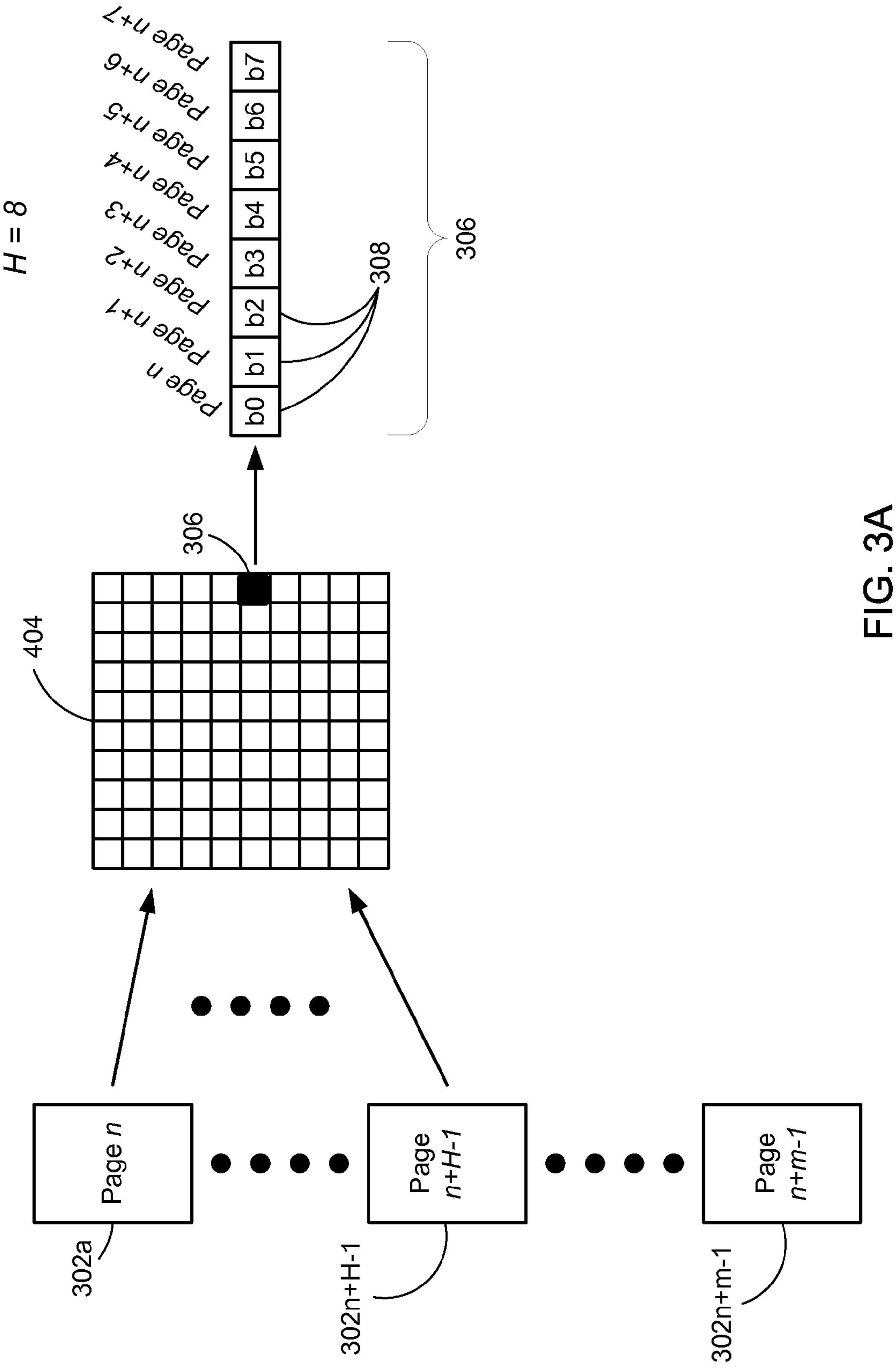
FIG. 3A is a visual representation of the relationship between pages, a page transition block and a packed pixel according to a first embodiment of the present invention.

FIG. 3A is a visual representation of the relationship between pages 302, a page transition block 404 and a packed pixel 306 according to a first embodiment of the present invention. Page n 302*n* to page n+m−1 302*n*+m−1 represent m pages in a document. The page transition block 404 represents a transition page between page n 302*n* and page n+H−1 302*n*+H−1. In this embodiment, H is the number of pages represented in each page transition block, and for this particular embodiment H=8. Thus, the transition block 404 represents a transition page between page n and page n+7 (8 pages). The transition block 404 is comprised of a plurality of packed pixels 306; each packed pixel corresponds to a pixel (or location) on a page of the document 302. Unless specified otherwise, throughout this application the term "pixel" refers to a location "location in a page." In other words, "the pixel (k, l) in page 1" and "the pixel (k, l) in page 2" represent the same location but just in different pages of the document. The present invention advantageously encodes the high-order color bits from each pixel for given page. Specifically, each pixel in the transition block 404 encodes the high-order color bit or bits of the corresponding pixel of each H consecutive pages. In the example shown in FIG. 3A, there are 8 pages per transition block 404 (H=8), each pixel is represented by a single bit (CBITS=1) and the packed pixel 306 size is eight bits. Thus, the packed pixel 306 includes eight bits 308, bits $b_0$ to $b_7$, and each bit represents the color of a pixel from page n to page n+7, respectively. Thus, the color is encoded into monochrome values since there is only one bit per pixel that can be either black or white. This is particularly advantageous because it reduces the number of times that the frame buffer 610 needs to be updated with the page transition block 404, and at high flip speeds the human eye cannot distinguish between similar levels of gray anyway.

Figure 3B:
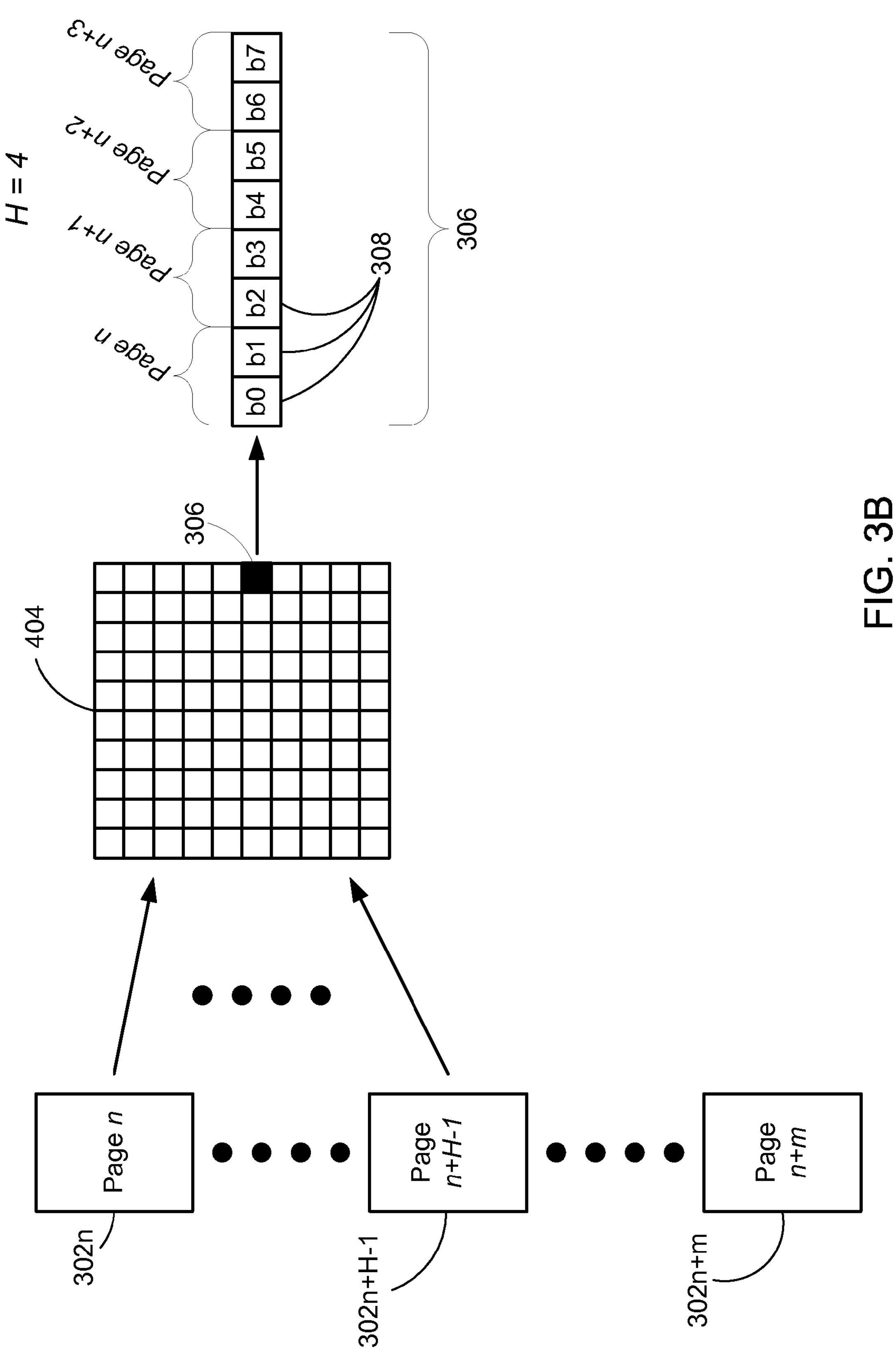
FIG. 3B is a visual representation of the relationship between pages, a page transition block and a packed pixel according to a second embodiment of the present invention.

FIG. 3B is a visual representation of the relationship between pages 302, a page transition block 404 and a packed pixel 306 according to a second embodiment of the present invention. In this embodiment, there are 4 pages per transition block 404 (H=4), each pixel is represented by 2 bits (CBITS=2) and the packed pixel 306 size is eight bits. Thus, the packed pixel 306 again includes eight bits 308, bits $b_0$ to $b_7$; however, here each pair of bits represents page n to page n+3, respectively. Thus, the packed pixel 306 provides 2-bit color values for each pixel. Those skilled in the art will recognize that in other embodiments of the present invention, the transition block 404 may include different numbers of pages, that each pixel may be represented by a different number of bits and that the packed pixel 306 may have a different size. The values used in FIGS. 3A and 3B are provided only by way of example to illustrate how the packed pixel 306 inside of a transition block 404 is be used to reduce the file size of page transition files 400 (see FIG. 4 below).

Figure 4A:
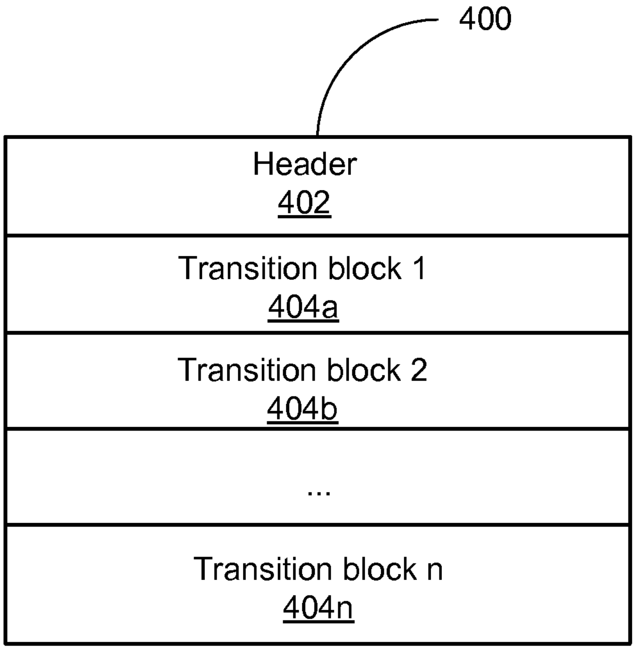
FIGS. 4A-4B are block diagrams of a page transition file having one or more page transition blocks, with each block representing transitions through pages according to one embodiment of the present invention.

FIG. 4A illustrates a page transition file 400 in a format that includes a header 402 and a sequence of page transition blocks 404*a-n* (referred to as page transition blocks 404 collectively); with each block 404*a-n* representing transitions through H pages. H is the number of pages represented in each page transition block 404.

Header 402 comprises components such as H, CBITS, N, OVERLAP and Num_Pix and values for these components.

CBITS is the number of bits used to represent color of a pixel from a single page within a packed transition pixel 306. N is the number of pages in the document represented by page transition file 400. OVERLAP is the number of pages that are duplicated in two sequential transition blocks. Num_Pix is the number of pixels in each page of the document. In one embodiment, the header 402 comprises the page width and page height in number of pixels, and Num_Pix is calculated by multiplying these two values together. In one embodiment, header 402 also comprises one or more of page transition speed and page transition direction supported by the page transition file 400.

The page transition block 404 represents a transition of H document pages. The page transition block 404 comprises Num_Pix packed transition pixels 306, each packed transition pixel 306 represented by H*CBITS bits wherein H groups of CBITS bits represent the varying colors of a pixel in H different document pages. These packed transition pixels 306 are used by the display controller 612 (See FIG. 6) to determine a corresponding waveform to drive the color of the corresponding pixel on physical media 120 to a desired color. In one embodiment, the packed transition pixel values are indices to the corresponding waveforms in the waveform buffer 608 (See FIG. 6) and the display controller 612 uses these packed transition pixels to retrieve the corresponding waveform from the waveform buffer 608.

In an alternate embodiment, the first few or last few page transition blocks 404 are padded with dummy pages comprising of white pixels or some other solid color or neutral pattern pixels. The dummy pages are space filers in a page transition block 404 used when a previous page or a next page does not exist in the document but is used in page transition blocks 404 to adhere to the page transition file format. Because the last few pages do not exist in the document, the page transition file creation system 500 (See FIG. 5) adds dummy pages in place of the non-existing pages.

Figure 4B:
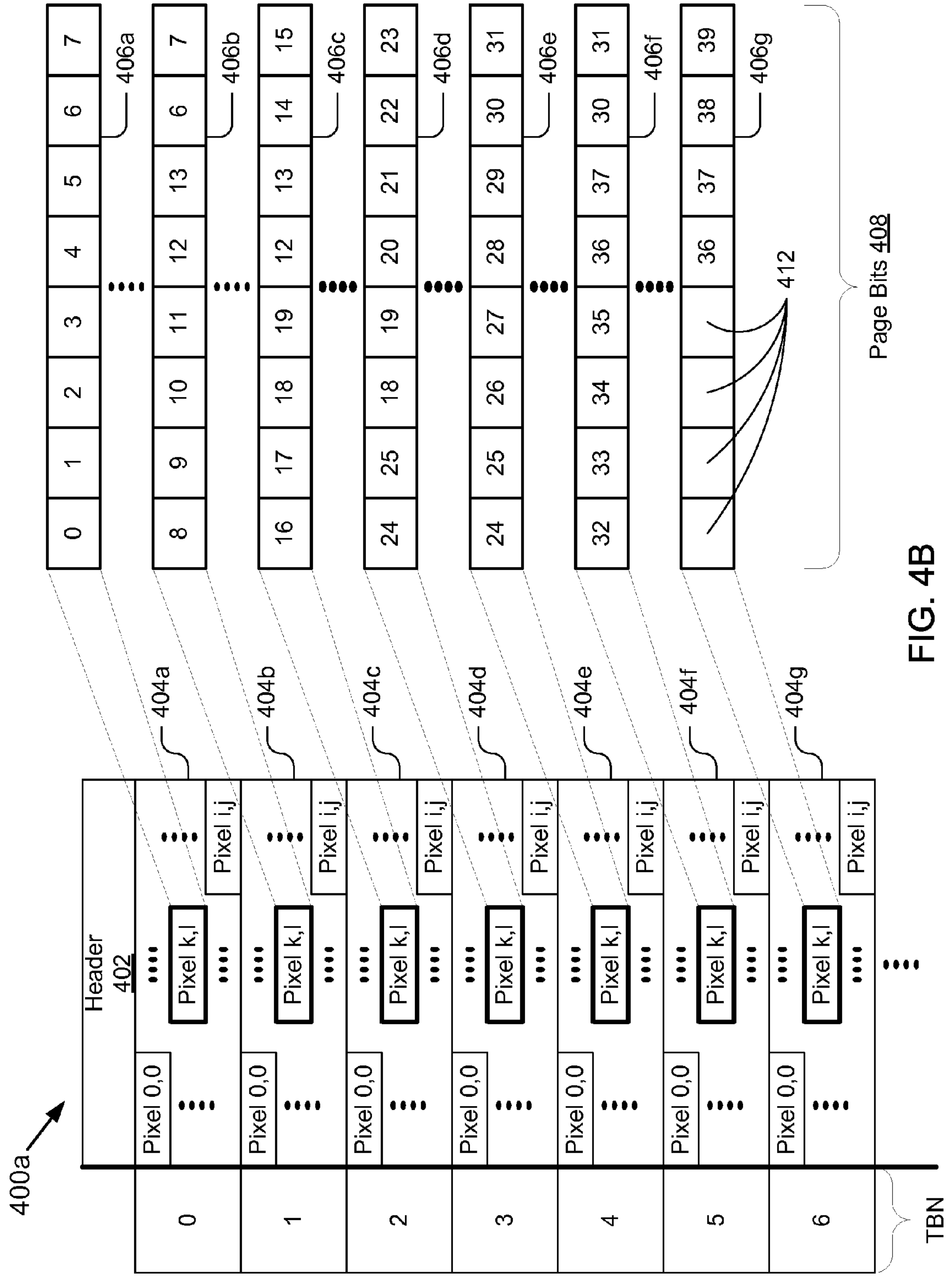

FIG. 4B shows an embodiment of a page transition file 400*a* having a header 402 and one or more page transition blocks 404*a*-404*g*, with each block 404 representing transitions through H pages 302. As shown in FIG. 4B, each page transition block 404 includes Num_Pix packed transition pixels 406*a*-406*g*. In one embodiment, the page transition block 404 is a two-dimensional array of pixels from pixel 0, 0 to pixel i, j. Although not part of the page transition file 400*a*, FIG. 4B shows the transition block number (TBN) associated with each page transition blocks 404*a*-404*g*, respectively. In an alternate embodiment, the transition block numbers are part of the page transition file 400*a*; however, they are not necessary because each page transition block 404*a*-404*g* is a fixed size array. FIG. 4B also shows an expanded view of a given packed transition pixel 406, pixel k, l, for each page transition block 404 in the page transition file 400*a*. As can be seen from FIG. 4B, each packed transition pixel 406*a*-406*g* has 8 bits 408. As shown in FIG. 4B, the last packed transition pixel 406*g* includes a number of dummy pages 412 to complete the packed transition pixel 406*g* so its size is consistent with the others, but these dummy pages 412 are ignored and thus can have any value as there are no pages after page 39.

Figure 4C:
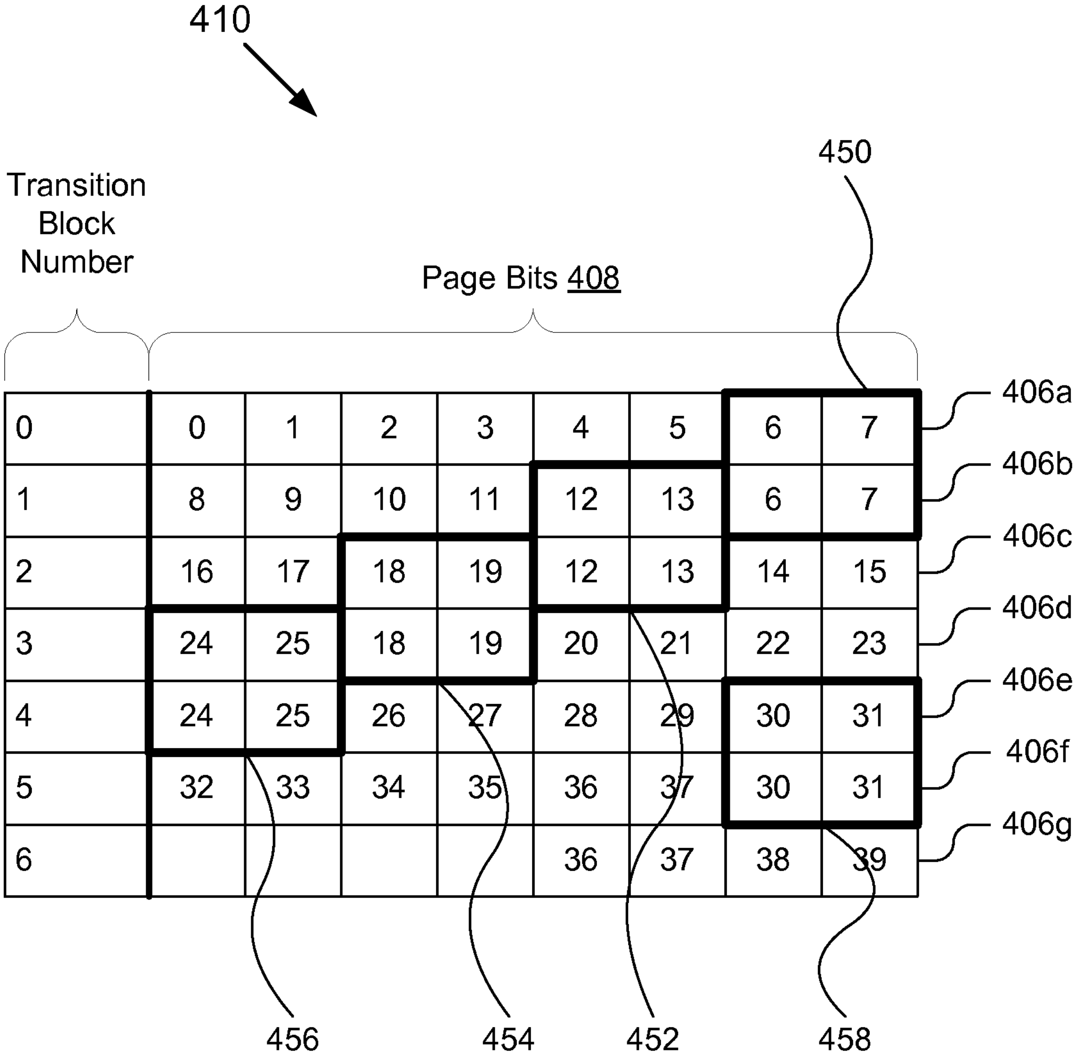
FIG. 4C is a block diagram of a table illustrating portions of the page transition file for a particular pixel to show pseudo double buffering according to one embodiment of the present invention.

Referring now also to FIG. 4C, the present invention is particularly advantageous because it provides pseudo-double buffering between the page transition block 404 and the previous and next page transition blocks 404. Each page transition block 404 in the page transition file 400 covers a set of consecutive pages that overlaps with pages covered by the previous block and pages covered by the next block. As can be seen in the example of FIG. 4B, the packed transition pixel 406*a* of the first transition block 404*a* in the page transition file 400*a* covers pages 0-7, the packed transition pixel 406*b* of the second transition block 406*b* covers pages 6-13, and the packed transition pixel 406*c* of the third transition block 406*c* covers pages 12-19. These overlapping regions are arranged such that the bit position representing an overlapped page is the same in both transition blocks 404 containing it.

FIG. 4C shows a table 410 illustrating portions of the page transition file 400*a* for a particular pixel to show pseudo double buffering according to one embodiment of the present invention. FIG. 4C shows the transition block number and the page bits 408 for the pixel k, l 406*a*-406*g* for respective page transition blocks 404*a*-404*g* similar to that shown in FIG. 4B. FIG. 4C also illustrates how the bits 408 for given page transition blocks 404*a*-404*g* align from one transition block 404 to another 404. More specifically, the bit positions 408 of the transition pixels 406*a*-406*g* where they duplicate page values also encoded by a neighboring transition block are shown by the series of boxes 450, 452, 454, 456 and 458. As can be clearly seen, each packed transition pixel 406*a*-406*g* of the transition block 404*a* has OVERLAP bits of the page transition blocks 404*a*-404*g* aligned with the transition blocks 404*a*-404*g* before and after it (where in this example OVERLAP=2). For example, for packed transition pixel 406*b* that corresponds to transition block 404*b*, the 2 least significant bits have the same value of as packed transition pixel 406*a* that corresponds to the first transition block 404*a* (e.g., it matches the prior transition block 404*a*, see box 450); and the next 2 least significant bits have the same value of as packed transition pixel 406*c* that corresponds to the third transition block 404*c* (e.g., it matches the next transition block 404*c*, see box 452). In other words, the highest OVERLAP pages from the previous page transition block 404 are duplicated to the next page transition block 404 while keeping the same bit position. The page bit position always increases left-to-right, wrapping around from the rightmost bit back to the leftmost. This continues for successive blocks until all pages are represented in the page transition file 400.

Still referring to FIG. 4C, the numbers used in the page bits 408 refer to specific page numbers of the original document. FIG. 4C illustrates an example of a page transition file 400*a* representing a 40 page document with pages numbered 0-39. The corresponding page transition file 400*a* includes seven page transition blocks 404*a*-404*g*, representing pages 0-7, 6-13, 12-19, 18-25, 24-31, 30-37 and 36-39, respectively. Each transition block 404*a*-404*g* in the page transition file 400*a* comprises a 2-D array of transition pixels 406, each transition pixel 406 including one bit from the corresponding pixel of each of the eight pages covered by the block 404. The bit positions of the transition pixels 406*a*-406*g* for each block 404*a*-404*g* are shown in the table of FIG. 4C. Each of the pages represented in more than one transition block 404 are highlighted in FIG. 4C by the boxes 450, 452, 454, 456 and 458 covering multiple pixels 406.

A page transition file creation system 500 creates files in the page transition file format described in FIG. 4A-4C. The page transition file creation system 500 and the method for creating a page transition file are discussed below in FIGS. 5, 9, 10A, 10B, 11A and 11B. The update controller 608 receives page transition blocks 404 from the page transition file 400 and stores pixel data in the frame buffer 610. The update controller 608 also generates waveform lookup tables and stores them in the waveform buffer 608. The display controller 612 then uses the pixel data in the frame buffer 610 and waveform lookup table in the waveform buffer 608 to drive the color of a pixel on physical media 120. The display controller 612 and the method for using the page transition file 400 to drive a pixel color on physical media 120 are described below with reference to FIG. 11.

Waveform Look-Up Table

A waveform lookup table comprises waveforms (sequence of voltages applied over time) applied by display controller 612 to drive a pixel on physical media 120 based on an index value stored in the pixel's location in frame buffer 610. In one embodiment, the waveform lookup table is divided into time periods represented by frames and each frame includes a part of the waveform required to drive the pixel. In this embodiment, the waveform lookup table maps a waveform index (represented as a transition pixel) and a frame number to a voltage that should be applied to the pixel represented by a given transition pixel for that frame. Each frame is used for a time period like 20 milliseconds (ms). In one embodiment, frames may be used for varying time periods. The display controller 612 reads a new frame from the lookup table every time period to determine the charge that should be applied.

The example below in FIGS. 8A-8H illustrates example waveform lookup tables created on the fly in accordance with the present invention. In one embodiment, the waveform lookup table comprises waveforms that account for multiple optical states to which to drive a pixel. For example, a waveform lookup table includes a waveform that changes the pixel color to the values of black or white for each page transition. The disclosed file format supports different predefined waveform lookup tables for different page-flip speeds, direction of page transition, and values for H and CBITS for a particular page transition file. Waveform lookup tables can also be generated on the fly for a particular set of variables.

The speed with which pages are flipped is defined in terms of a transition length, which is equal to the number of frames taken by display driver to change the color of a pixel from the optical state of that pixel on one page to the optical state of that pixel on a subsequent page. Specifically, the rate at which images are presented is equal to the reciprocal of the transition length times the duration of a single frame. For example, a frame duration of 20 ms and a transition length of three frames would present pages at a rate of 1/(3*20 ms), or approximately 16.7 page presentations per second (pps).

In the present invention, waveforms are generated from component pieces of the page transition file 400 on the fly. The present invention generates the waveforms on the fly to match the requested page flip speed (number of frames per page), flipped direction, H and CBITS. These waveforms are then written to the waveform buffer 608 so they are aligned to match the page bit positions of the current transition block, with the bit position for the requested start page aligned such that it falls on the frame following the frame currently being updated by display controller 612. The display controller 612 uses the waveform stored in the waveform buffer 608 to apply voltages to the physical media 120. In other methods each index in a waveform table typically represents the waveform required to transition a pixel from one color to another. In the present invention, however, the index actually represents a repeating sequence of transitions through H colors, one color (black or white) for each set of CBITS bits in the waveforms index number. Specifically, each waveform index in a waveform lookup table can be thought of as representing a sequence of H colors, each color represented by CBITS bits (where a waveform index is defined as H times CBITS bits in length). Each waveform index maps to a waveform that represents the cyclic pattern of voltages required to drive a pixel through each of the H colors, wrapping back from the last of the H colors presented back to the first. This pattern of voltages is then repeated for the width of the waveform lookup table. Each transition from one color to the next is allotted the number of frames equal to the transition length defined for the waveform lookup table, and the order in which each color is presented is determined by the flip direction, with forward flipping transitioning to the right through the sequence of colors defined by the waveform index and backwards flipping transitioning to the left.

Figure 8A:
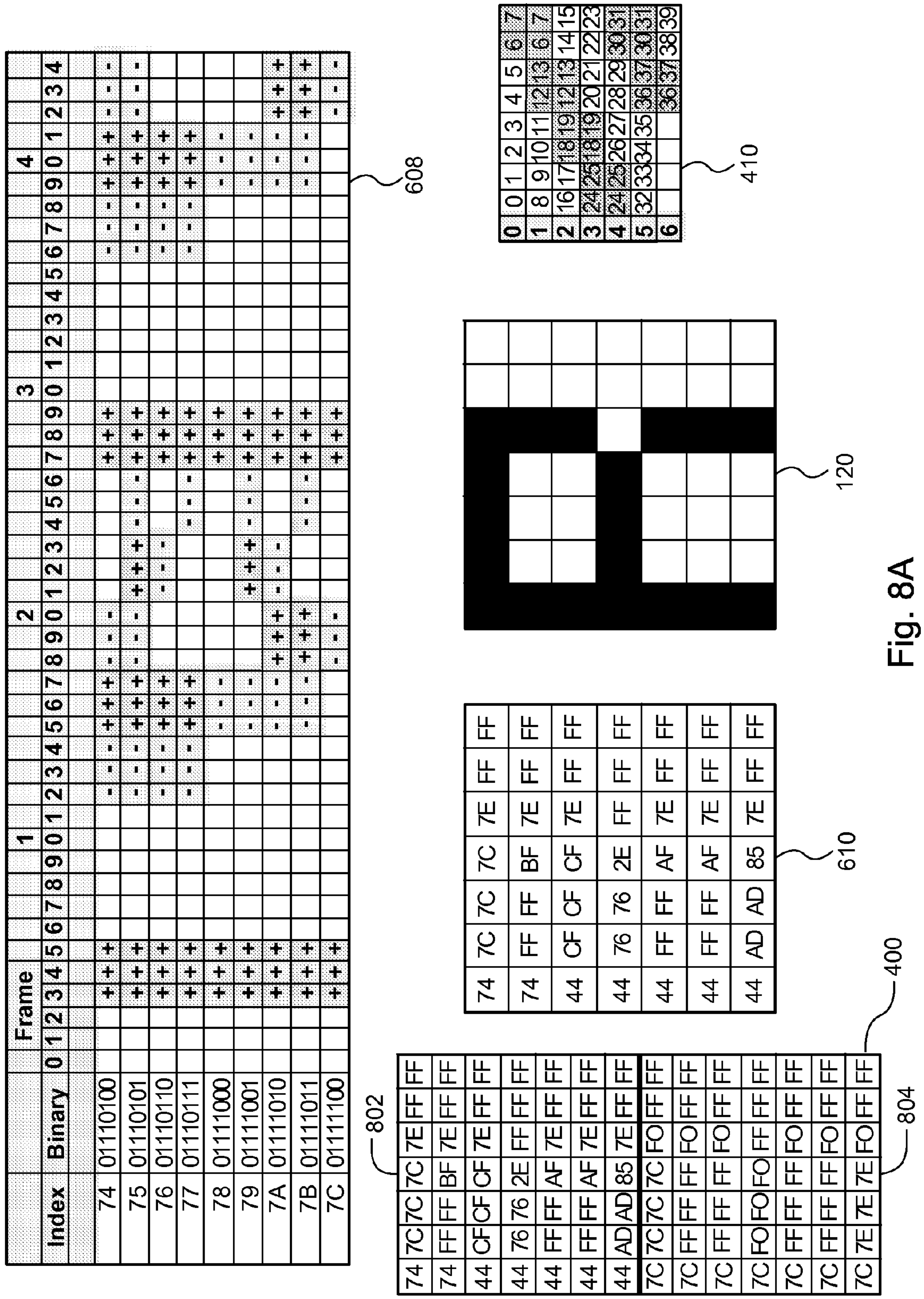
FIGS. 8A and 8D-8H are visual representations of the waveform buffer, the frame buffer, the physical media, portions of the page transition file and the state of pseudo double buffering at different times in the process of displaying according to an embodiment of the present invention.
Figure 8B:
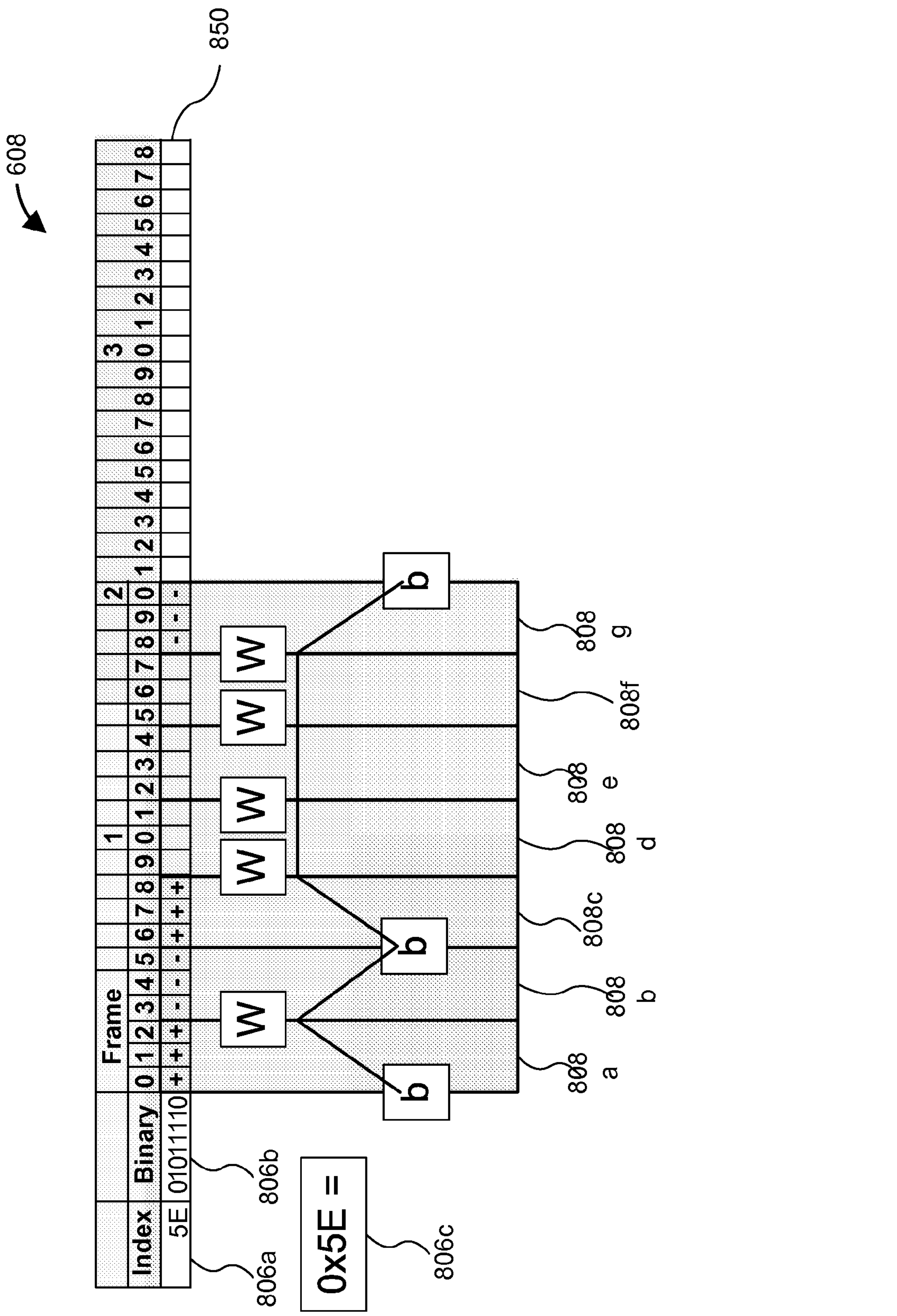
FIGS. 8B and 8C are visual representations of the waveform applied for one example of fast page flipping according to an embodiment of the present invention.
Figure 8C:
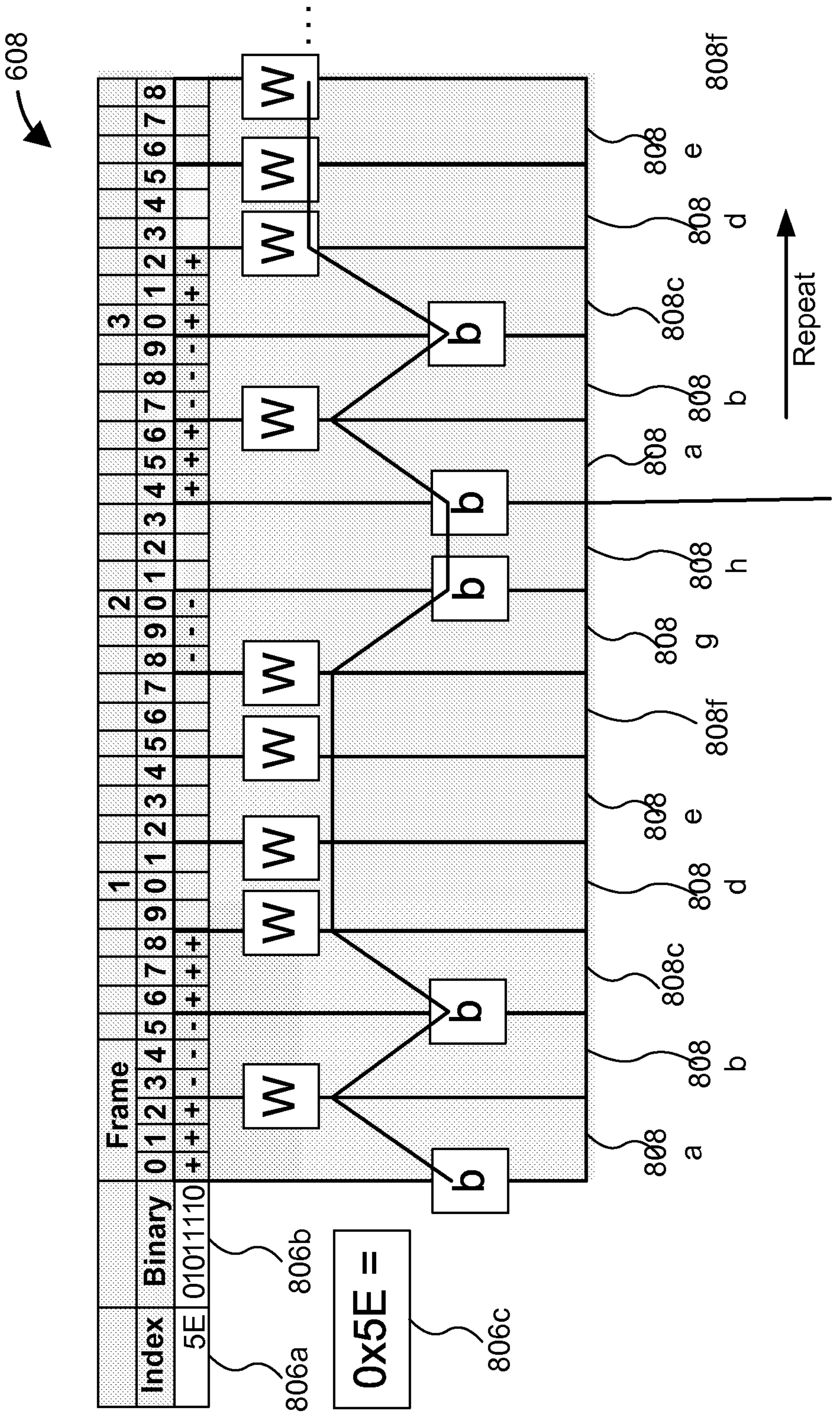

FIGS. 8B and 8C illustrates an example of waveform buffer 608 storing a waveform of a waveform lookup table for index 0x5e HEX flipping forwards at 3 frames per page, aligned such that the transition from the page represented by the left-most bit occurs starting at frame 0. The example waveform 850 is in a lookup table where H is equal to 8, CBITS is equal to 1. An index 806 to the waveform 850 is provided. For illustration purposes only, FIGS. 8B and 8C show the index 806 in a hexadecimal representation 806*a*, a binary presentation 806*b* and the index representation 806*c*. For this example, the index value is 0x5e. The waveform 850 is illustrated as a series of positive, negative or zero voltages during each frame. For illustrative purposes, an entry indicating that a pixel should be made lighter (driven towards white) is listed as a plus (+) sign, an entry indicating that a pixel should be made darker (driven towards black) is listed as a minus (−) sign, and an entry indicating no change should occur is left blank. These entries should not necessarily be interpreted as the sign of voltage actually applied to a pixel. In particular, depending on the physical medium a particular display might apply a negative voltage (e.g. −15 V) to a pixel for a given frame to drive that pixel towards white. As can be seen, the binary representation of the index 806*b* corresponds to the transitions in the value of the pixel. For forward page transitions (as is the case in the example), if the binary representation of a waveform index number is $b_0b_1b_2b_3b_4b_5b_6b_7$, the waveform for forward flipping will represent these sequence of voltages that would drive a pixel through the transitions $b_0$ to $b_1$ to $b_2$ to $b_3$ to $b_4$ to $b_5$ to $b_6$ to $b_7$ where each transition consists of a sequence of S frames of the appropriate voltage to effect the given transition where S is the requested number of frames per page. As illustrated by FIG. 8C, this sequence is repeated for long as necessary to fill the waveform table, with the sequence looping back with the transition $b_7$ back to $b_0$. For example for the waveform 850 shown in FIG. 8B, if applied produces each of the transitions between successive bits in the binary value. For example, the first bit of the binary index 806*b* is equal to zero and corresponds to frames 0, 1 and 2. During this time, the pixel value transitions from black (the first bit value) to white (the second bit value) and the waveform 850 causes the display controller 612 to output voltages for three frames 808*a* to produce such a transition in the physical media 120. For the three frames 3, 4 and 5 808*b*, the pixel value transitions from white (the second bit value) to black (the third bit value) and the waveform 850 causes the display controller 612 to output voltages to drive any pixel with a value of hexadecimal 0x5E towards black for three frames 808*b*. For frames 6, 7 and 8 808*c*, the pixel value transitions from black (the third bit value) to white (the fourth bit value) and the waveform 850 again has positive value for three frames. For frames 9, 10 and 11 808*d*, the pixel value does not change and since the values are the white, the waveform 850 would dictate the application of zero by the display controller 612. Since the waveform only represents 8 bits or 21 frames (seven transitions), as shown in FIG. 8C, the waveform is repeated after the 24th frame, with the transition between the color defined by the right-most bit of the waveform index (black) back to the color defined by the left-most bit of the waveform index (also black) occupying frames 22, 23 and 24. The sequence specified by the index 806 is then repeated as long as necessary to fill the waveform table. For backwards page flipping, a waveform index of the form waveform $b_0b_1b_2b_3b_4b_5b_6b_7$ becomes associated with the sequence of voltages that would drive a pixel through transitions $b_0$ to $b_7$ to $b_6$ to $b_5$ to $b_4$ to $b_3$ to $b_2$ to $b_1$.

System Overview

Figure 5:
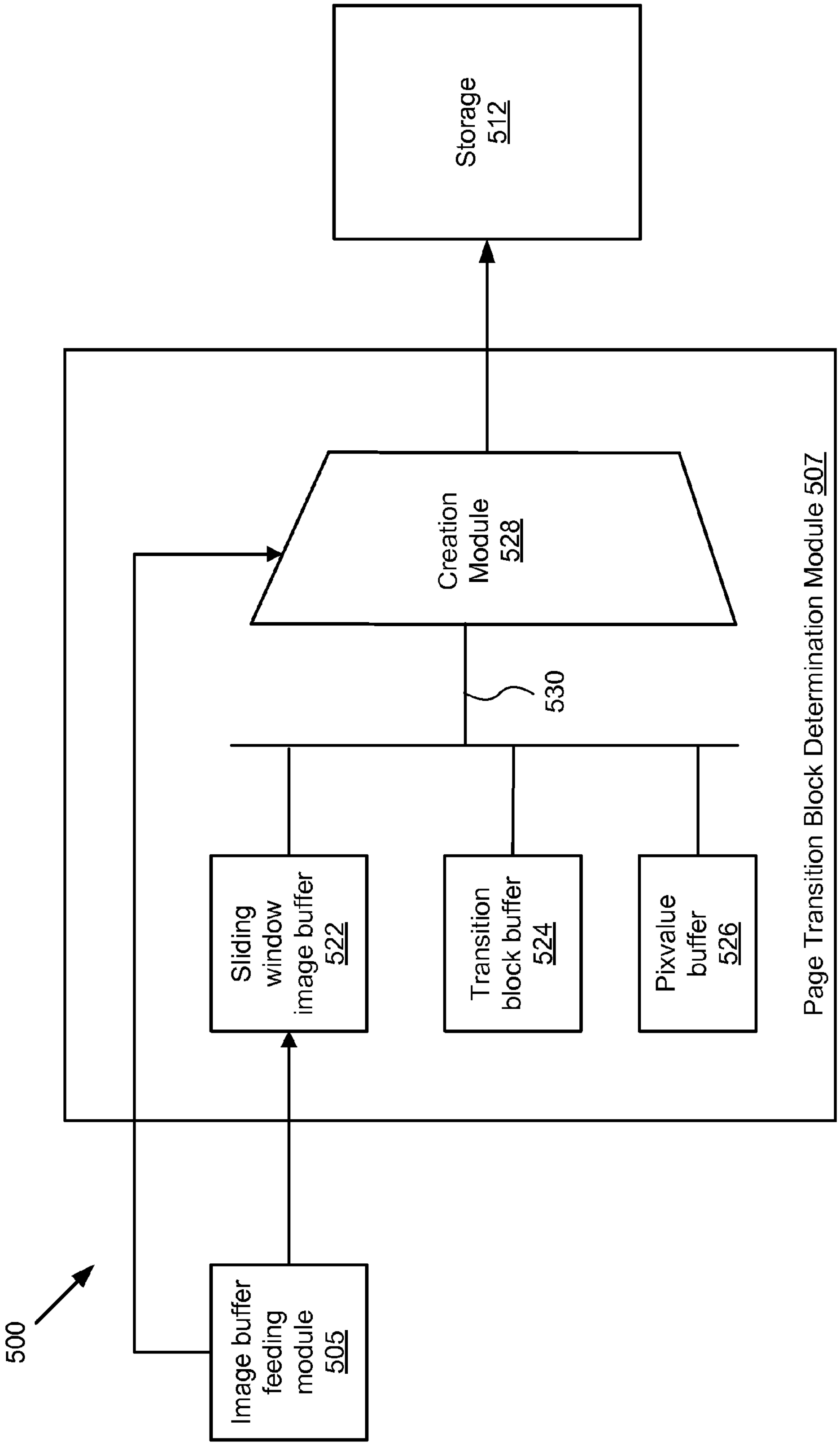
FIG. 5 is a block diagram of a page transition file creation system according to one embodiment of the present invention.

FIG. 5 illustrates a page transition file creation system 500 according to some embodiments of the invention. The page transition file creation system 500 comprises an image buffer feeding module 505, a page transition block determination module 507 and storage 512. The image buffer feeding module 505 communicatively couples to page transition block determination module 507 and the page transition block determination module 507 communicatively couples to storage 512.

The image buffer feeding module 505 extracts page images from a document and transmits the images to the sliding window image buffer 522 in page transition block determination module 507. Additionally, the image buffer feeding module 505 transmits to sliding window image buffer 522 and creation module 528 in page transition block determination module 507 values for H, CBITS, N and Num_Pix for the document. In one embodiment, the page width and height in pixels is transmitted instead of Num_Pix, and Num_Pix is calculated from these two values.

The page transition block determination module 507 receives images from image buffer feeding module 605 and produces a page transition file 400 comprising header 402 and page transition blocks 404. The page transition block determination module 507 comprises sliding window image buffer 522, a transition block buffer 524, a Pixvalue buffer 526 and creation module 528. These buffers 522, 524, 526 and creation module 528 are communicatively coupled to each other through a communication bus 530. The sliding window image buffer 522 is also communicatively coupled to image buffer feeding module 505. The creation module 528 is also communicatively coupled to image buffer feeding module 505 and storage 512.

The sliding window image buffer 522 is a computer readable storage medium like a hard drive, random access memory, compact drive, a flash memory or a DVD. The sliding window image buffer 522 stores page images received from image buffer feeding module 505. In one embodiment, the sliding window image buffer 522 receives and stores pointers to page images instead of the page images themselves.

The transition block buffer 524 is a computer readable storage medium like a hard drive, random access memory, compact drive, a flash memory or a DVD. The transition block buffer 524 stores a page transition block that is being created by creation module 528.

The Pixvalue buffer 525 is a computer readable storage medium like a hard drive, random access memory, compact drive, a flash memory or a DVD. The Pixvalue buffer 525 stores a packed page transition pixel that is being created by creation module 528.

The creation module 528 creates the page transition file 400 with header 402 and page transition blocks 404. The creation module 528 retrieves page images or pointers to page images from sliding window image buffer 522, creates in Pixvalue buffer 525 packed page transition pixels representing transition of a pixel's color in H page images, and stores the completed transition pixel in transition block buffer 524. The creation module 528 repeats this process for every pixel in a page image to create page transition blocks 404 in transition block buffer 524. After completing a page transition block 404, the creation module 528 stores the page transition block 404 in a page transition file 400 on storage 512. In one embodiment, the creation module 528 creates a plurality of page transition files 400 from the received page images with each of the created page transition files representing page transitions in different directions, at different speeds, or with different values of CBITS, H and/or OVERLAP. The functionality of creation module 528 is also explained below with reference to FIGS. 9, 10A, 10B, 11A and 11B.

Storage 512 is a computer readable storage medium like a hard drive, random access memory, compact drive, or a flash memory. Storage 512 is used by creation module 528 in page transition block determination module 507, in one embodiment, to store page transition blocks 404 in a page transition file 400.

Figure 6:
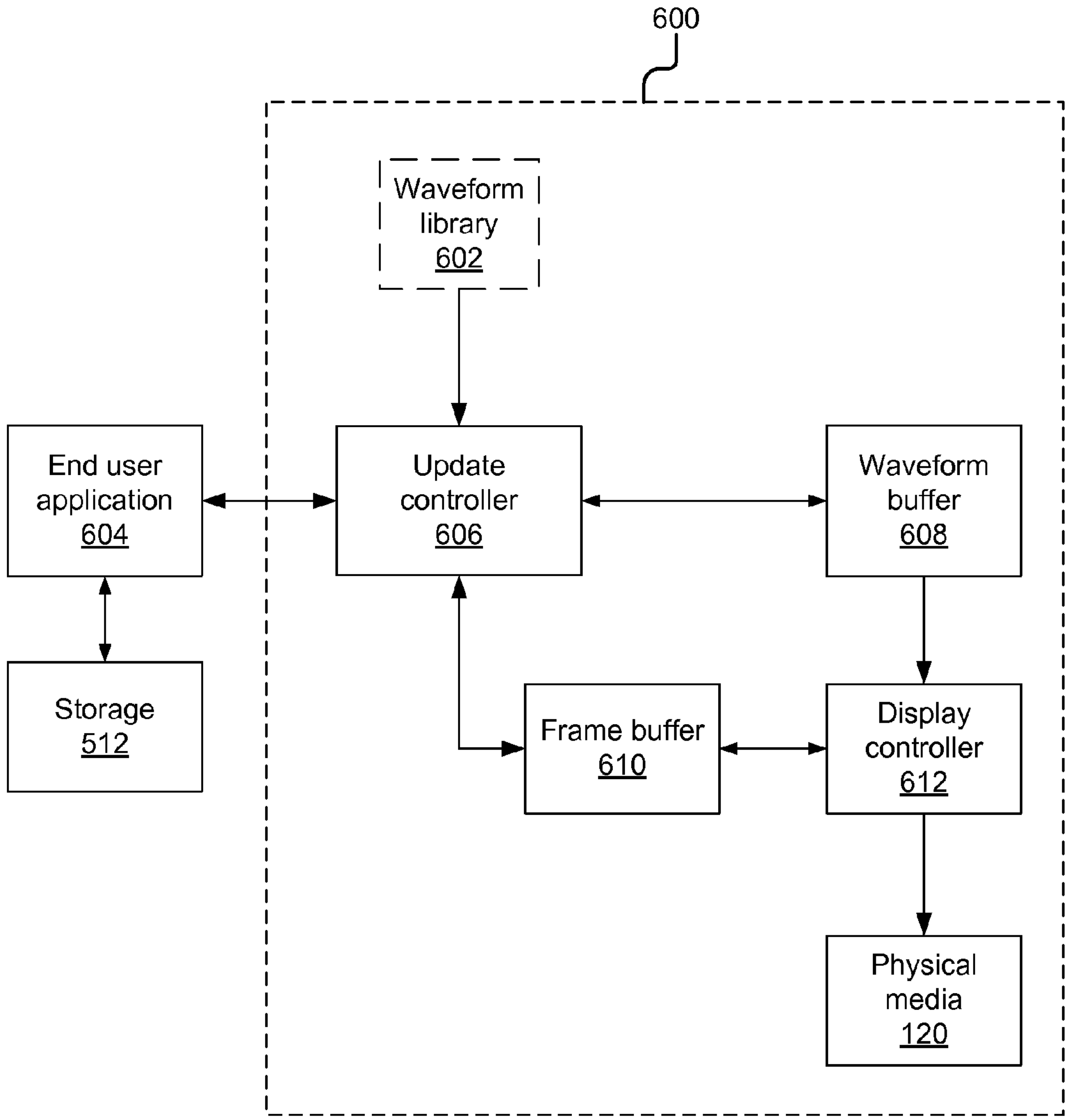
FIG. 6 is a block diagram of a page transition display system and an end user application according to an embodiment of the present invention.

FIG. 6 illustrates a page transition display system 600, an end user application 604 and the storage 512 according to some embodiments of the invention. The page transition display system 600 comprises a waveform library 602, an update controller 606, a waveform buffer 608, a frame buffer 610, a display controller 612 and a physical media 120.

The storage 512 is communicatively coupled to the end user application 604. The storage 512 is a computer readable storage medium like a hard drive, random access memory, compact drive, flash memory or a DVD. The storage 512 stores one or more page transition files 400. In one embodiment, the storage 512 also stores pre-generated waveform lookup tables. In one embodiment, a user of the page transition display system 600 transfers to the storage 512 page transition files 400 from a download location or a computer readable storage medium. In another embodiment, the storage 512 is the same storage as storage 512 of FIG. 5 and the creation module 528 stores page transition files 400 in storage 512.

The end user application 604 receives user input and determines the document, start page from which the page transition starts, page transition speed and page transition direction. In one embodiment, the user also specifies a value for H, CBITS and/or OVERLAP in the end user application or end user application 604 uses values for H, CBITS and/or OVERLAP that best meet the application's requirements, and end user application 604 then retrieves an appropriate transition file that matches the specified values for H, CBITS and OVERLAP. The end user application 604 transmits start page, page transition speed, page transition direction, page transition start stop signal to the update controller 606. The end-user application 604 also sends the page transition file 400 or a reference to it to the update controller 606.

The waveform library 602 is communicatively coupled to the update controller 606. The waveform library 602 stores various pre-generated waveform lookup tables and other waveforms used by the update controller 606. In one embodiment, waveform library 602 stores prototype waveform lookup tables which are then modified by the update controller 606 for the on-the-fly generation of waveform lookup tables. For example, waveform library 602 stores two prototype waveform lookup tables, one for each direction with CBITS=1, H=8 and transition length=1 frame per page transition. The update controller 606 then modifies the lookup table of the appropriate direction to match the desired page transition speed by duplicating each frame's entry the appropriate number of times. This simplifies the process of generating the waveforms to a mere copying operation. In another embodiment, the waveform library 602 stores default waveform lookup tables for commonly used values of H, CBITS, and speed and direction of transition. In another embodiment, the update controller 606 generates the waveform lookup table completely on the fly, and waveform library 602 is not used.

The update controller 606 is communicatively coupled to the waveform library 602, the waveform buffer 608, the frame buffer 610 and the end user application 604. The update controller 606 determines and stores the appropriate page transition block 404 in the frame buffer 610. The update controller 606 also generates a waveform lookup table and stores it in the waveform buffer 608. The update controller 606 also controls the generation and storage of data and the waveform buffer 608 and the frame buffer 610 to ensure that the data is aligned to match the bit positions for pages in the current transition block.

The update controller 606 receives from the end user application 604 a start page, the page transition speed selected by the end user through end user application 604, page transition direction, page transition start stop signal and page transition file 400. From the page transition file header 402 the update controller 606 determines H, CBITS, OVERLAP and Num_Pixels. The page transition start stop signal informs the update controller 606 to enter or exit the page transition mode and start page informs the update controller 606 to start the page transition from page numbered start page. In one embodiment, the end-user application 604 is responsible for insuring that the start page is currently being displayed. In another embodiment, the update controller 606 determines the start page image from the appropriate bits in the appropriate transition block 404 of the page transmission file 400 and transmits the start page image to the frame buffer 610 and the display controller 612 uses prior art methods to display that page. The update controller 606 will be described in more detail below with reference to FIGS. 7A, 11A and 11B.

In one embodiment, the end user application 604 transmits to the update controller 606 the page transition file 400 or an address of page transition file 400. The update controller 606 then determines part of the above mentioned information from header 402 of page transition file 400. In another embodiment, end user application 604 transmits a document identifier to the update controller 606 and it determines the page transition file 400 associated with the received document. In still another embodiment, the update controller 606 determines a default page transition file 400 corresponding to the received page transition speed, page transition direction, CBITS, OVERLAP or H. In yet another embodiment, the update controller 606 is preconfigured with or determines from a configuration file, the H, OVERLAP, page size and/or CBITS supported by display controller 612. The update controller 606 determines a corresponding page transition file 400 that supports the H, OVERLAP, page size and/or CBITS of display controller 612.

The waveform buffer 608 is communicatively coupled to the update controller 606 and the display controller 612. The waveform buffer 608 receives and stores a waveform lookup table corresponding to the page transition block received in the frame buffer 610. The storage of different waveform lookup tables into the waveform buffer 608 is controlled by the update controller 606. The display controller 612 uses the index provided from the frame buffer 610 to retrieve the appropriate waveform from the waveform buffer 608.

The frame buffer 610 is communicatively coupled to the update controller 606 and the display controller 612. The frame buffer 610 receives and stores page transition blocks received from the update controller 606. The frame buffer 610 provides the page transition blocks in response to request from the display controller 612. In one embodiment, the frame buffer 610 and waveform buffer 608 are portions of random access memory in display controller 612.

The display controller 612 is communicatively coupled to the waveform buffer 608, the frame buffer 610 and the physical media 120. The display controller 612 uses the received page transition blocks, waveform lookup table, and index to lookup waveforms, apply them to physical media 120, and drive the pixel colors on physical media 120 to desired colors. In one embodiment, the display controller 612 reads the transition pixel from a page transition block 404 and uses the value of transition pixel and the current frame number as indexes into the waveform lookup table stored in the waveform buffer to determine the appropriate voltage with which to drive the pixel to desired color in physical media 120.

The physical media 120 is coupled to and controlled by the display controller 612. In one embodiment, and the physical media 120 is the microcapsule layer 120 and has been explained above in reference to FIG. 1.

Figure 7A:
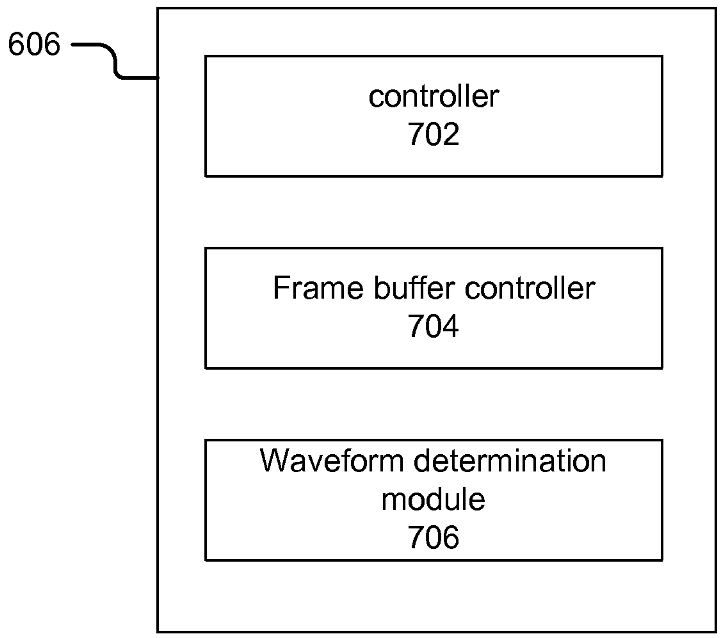
FIG. 7A is a block diagram of an update controller according to an embodiment of the present invention.
Figure 7B:
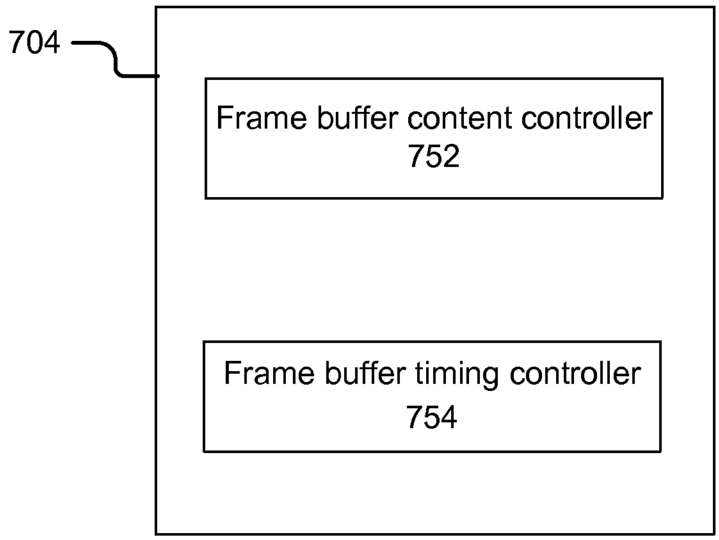
FIG. 7B is a block diagram of a frame buffer controller according to an embodiment of the present invention.

Referring now to FIGS. 7A and 7B, an embodiment of the update controller 606 is shown in more detail. This embodiment of the update controller 606 comprises a controller 702, a frame buffer controller 704 and a waveform determination module 706. The frame buffer controller 704 further comprises a frame buffer content controller 752 and a frame buffer timing controller 754.

The controller 702 is communicatively coupled to the frame buffer controller 704 and the waveform determination module 706. The controller 702 controls the overall process for receiving information from the end-user application 604, generating the waveform table, and storing page transition blocks 404 in a frame buffer 610. In particular, the controller 702 receives the information from the end-user application 604, cooperates with the frame buffer controller 704 to store pixel data into the frame buffer 610 and provide timing information, and cooperates with the waveform determination module 706 to generate and store waveform tables in the waveform buffer 608 at different times. In other words, the controller 702 is responsible for receiving control signals from the end-user allocation 604, extracting the component information from the header 402 of the page transition file 400 and generating control signals and data that are provided to the frame buffer controller 704 and the waveform determination module 706. One important aspect of the controller 702 is that it ensures that the waveform table is aligned to match the bit position of the current page transition block 404 in the frame buffer 610. It should also be noted that the controller 702 has a variety of other functions for loading data into the waveform buffer 608 and the frame buffer 610 and controlling the display controller for the presentation of pixel data in a conventional manner. The operation of the controller 702 is described in more detail below with reference to FIGS. 11A, 11B and 12.

The frame buffer controller 704 is coupled to the controller 702 to receive signals related to the storage of data in the frame buffer 610 and the timing of the storage of data in the frame buffer 610. As shown in FIG. 7B, the frame buffer controller 704 includes a frame buffer content controller 752 and a frame buffer timing controller 754. The frame buffer content controller 752 is communicatively coupled to receive page transition blocks 404 and store them in the frame buffer 610. The frame buffer content controller 704 is responsible for tracking and determining which of the page transition blocks 404 of a page transition file 400 are stored in the frame buffer 610, and which page transition block 404 should be stored in the frame buffer 610 next. The frame buffer timing controller 754 is used to determine the time at which a page transition block 404 can be written to the frame buffer 610. The frame buffer timing controller 754 also communicates with the controller 702 so that it knows whether pseudo double buffering is being used as part of the file format of the page transition file 400, and if so the value of OVERLAP. This along with other information from the header 402, allows the frame buffer timing controller 754 to determine the time at which the page transition blocks 404 are written to the frame buffer 610 and provides control signals to the frame buffer content controller 752. The operation of the frame buffer controller 704, the frame buffer content controller 752 and the frame buffer timing controller 754 are described in more detail below with reference to FIGS. 11A and 11B.

The waveform determination module 706 is communicatively coupled to the controller 702 and the waveform buffer 608. The waveform determination module 706 generates a waveform table and stores it in the waveform buffer 608. The waveform determination module 706 generates the waveform table on the fly. The waveform determination module 706 determines and transmits to waveform buffer 608 a waveform lookup table corresponding to one or more of speed, direction, start page, and values of H, OVERLAP and CBITS. The waveform table is generated to match the page transition speed and direction. The waveform determination module 706 uses one or more from the group of page transition speed, page transition direction, CBITS and H to determine the appropriate waveform lookup table that corresponds to the transmitted page transition block 404. The waveform determination module 706 uses one or more from the group of current frame, start page, CBITS, H and OVERLAP to write the waveform lookup table to the waveform buffer 608 aligned such that the portion of the repeating waveform responsible for transitioning from start page to the next page in the desired direction starts on the frame following the current frame. The start page, page transition speed, page transition direction, H, current frame, CBITS, OVERLAP and page transition start stop signal are received from the end-user application 604 or page transition file header 402 via the controller 702. In one embodiment, the waveform determination module 706 determines the need for a new waveform and then retrieves it from the waveform library 602. When the page transition start stop signal is turned on, the waveform determination module 706 selects and transmits a pre-defined waveform lookup table to waveform buffer 608.

Methods

Figure 8D:
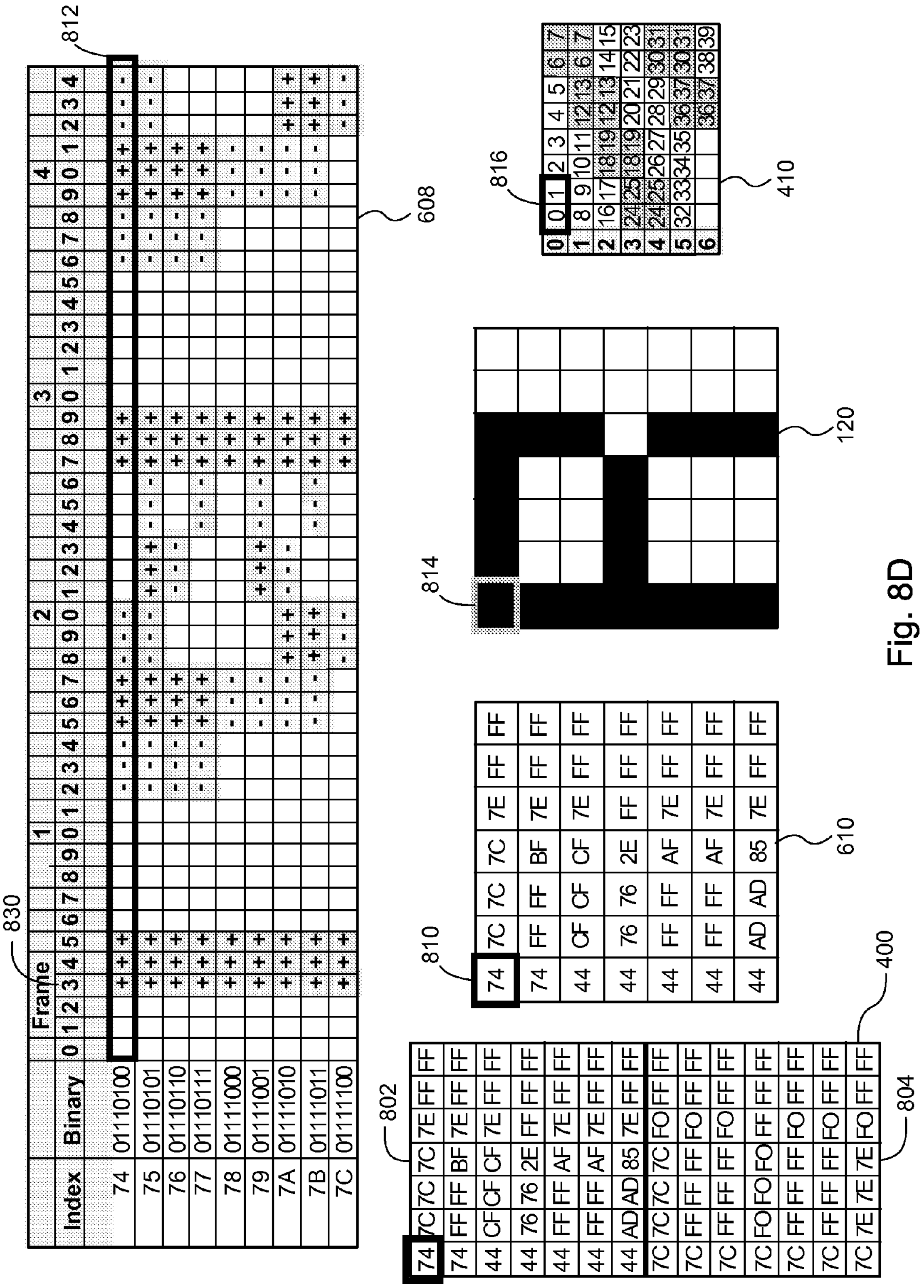
Figure 8E:
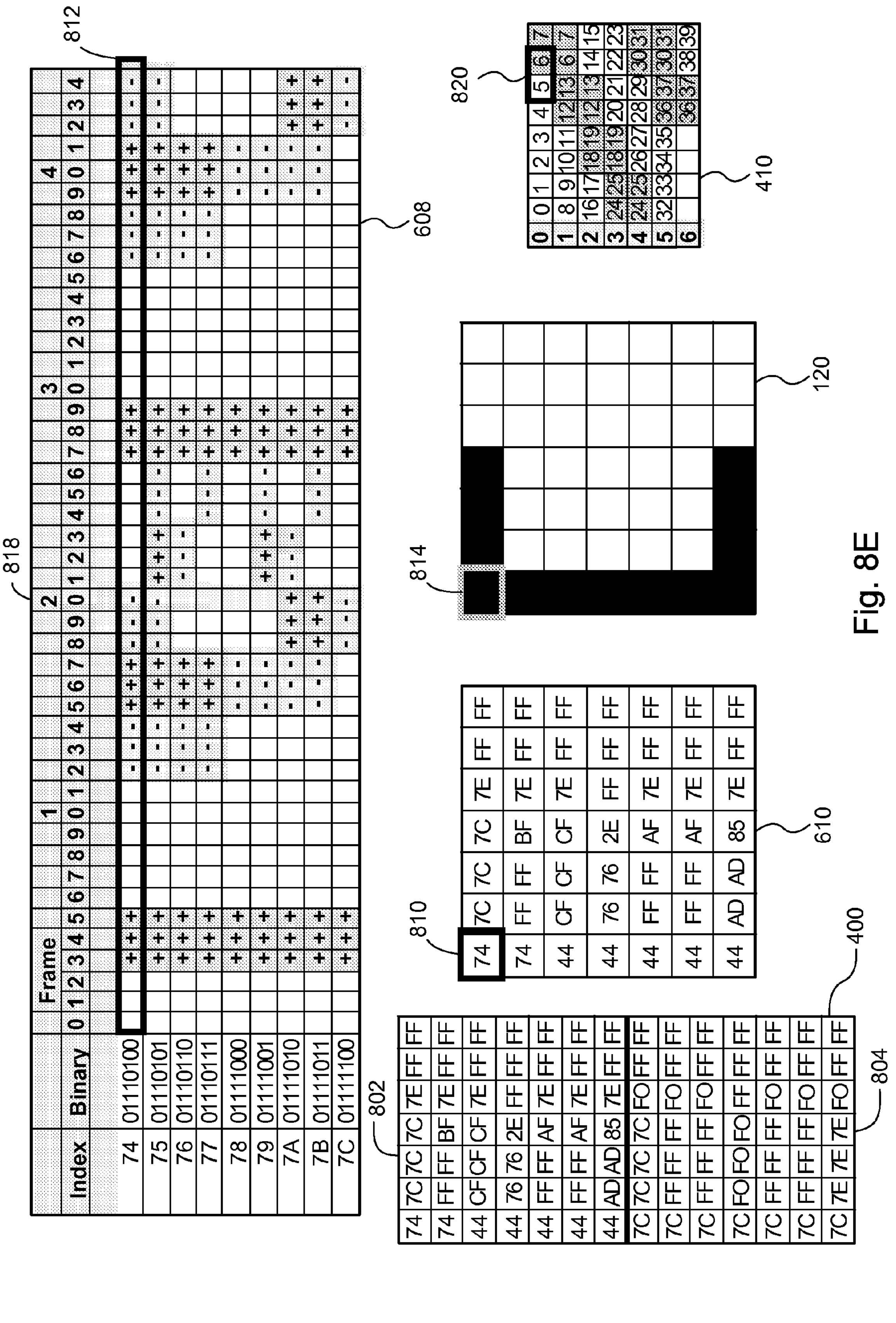
Figure 8F:
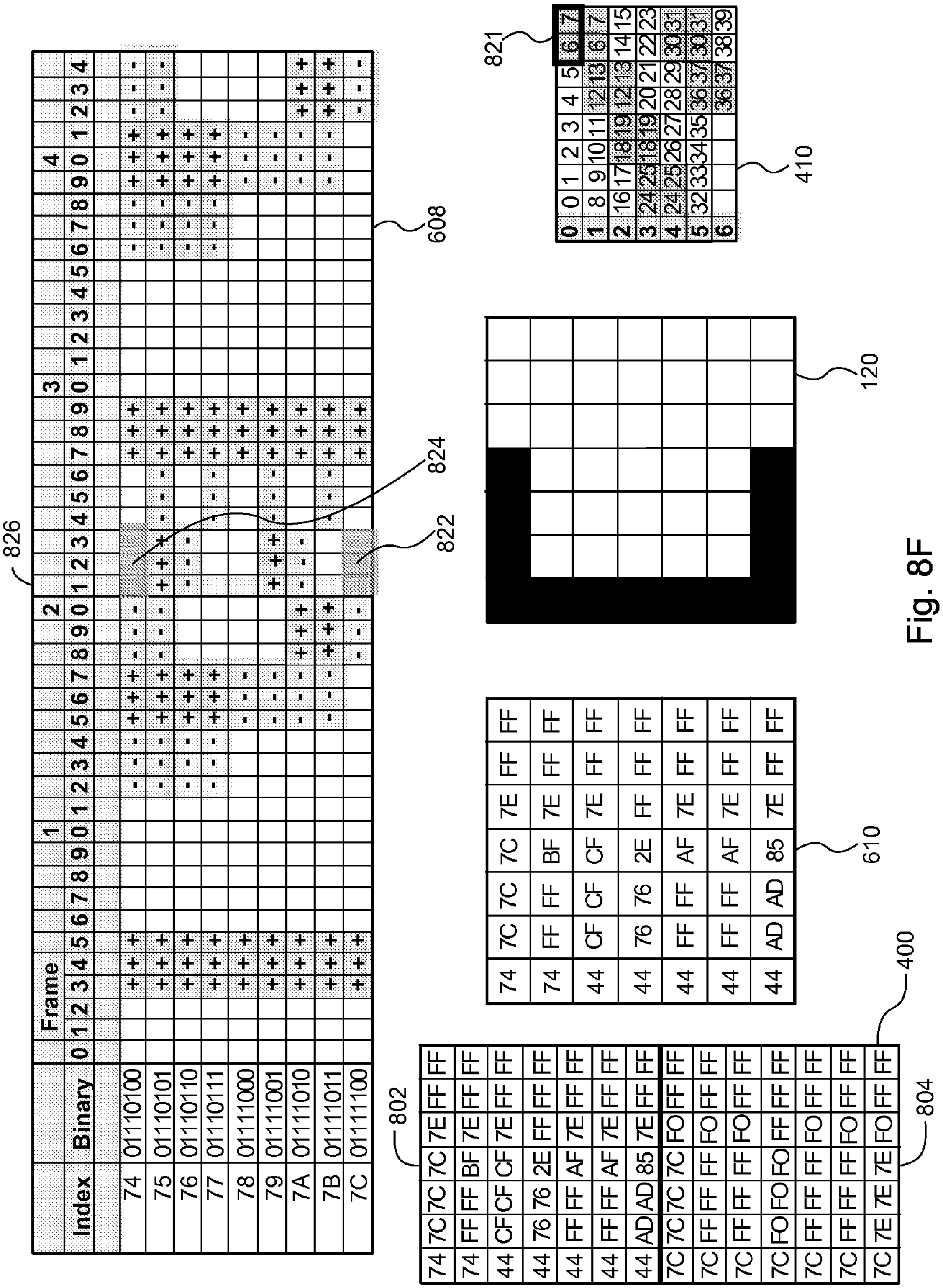
Figure 8G:
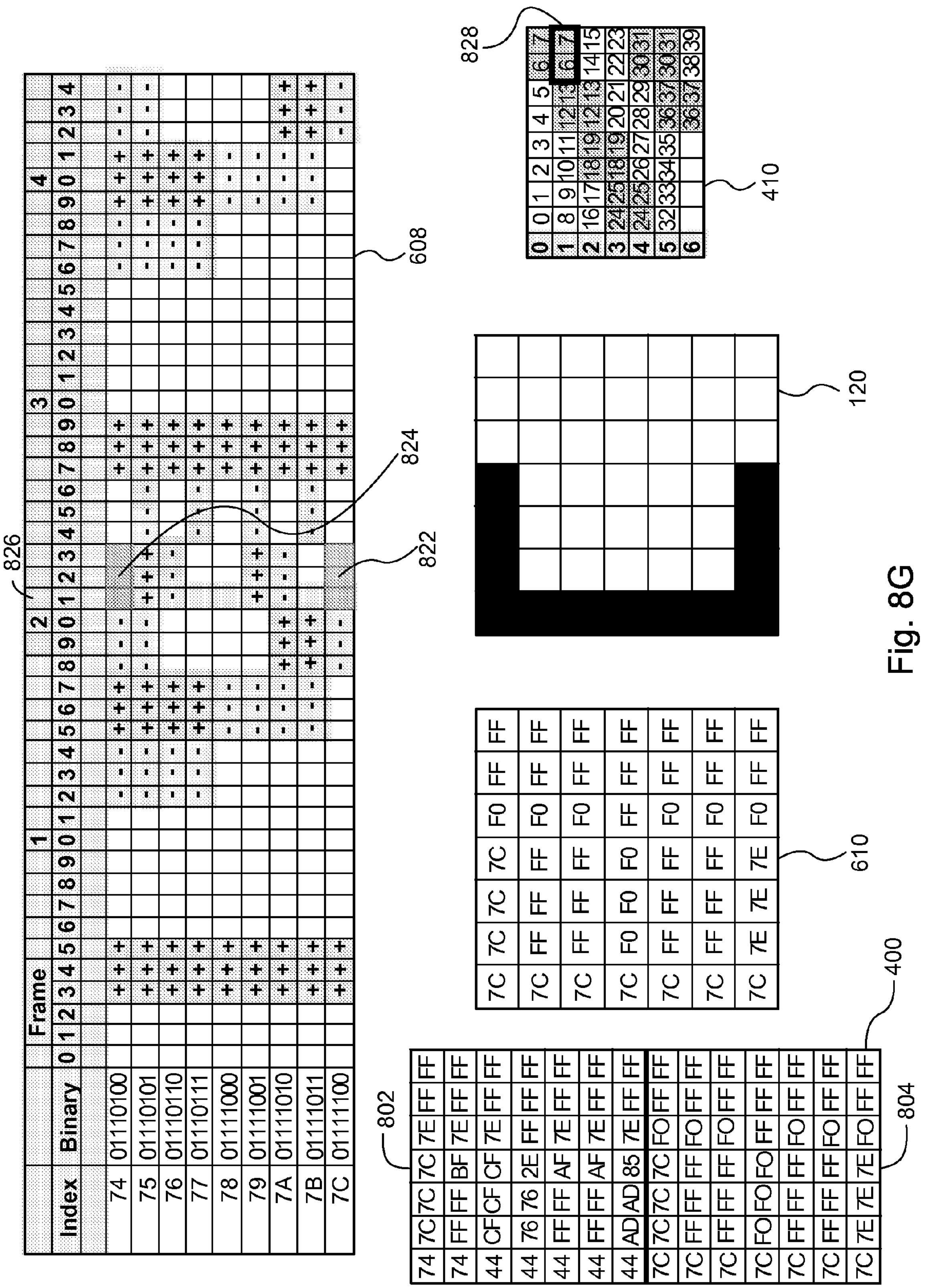
Figure 8H:
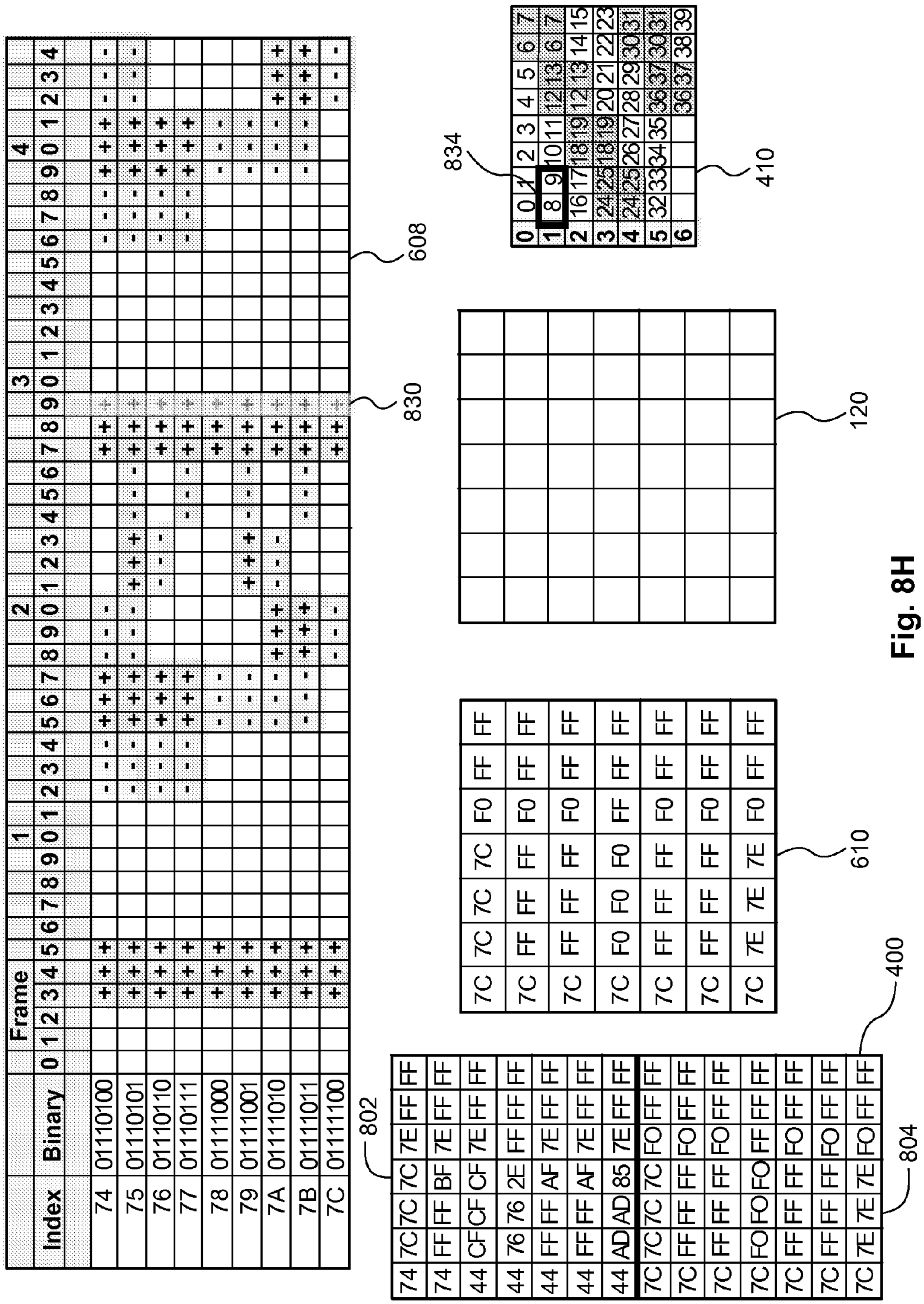
Figure 9:
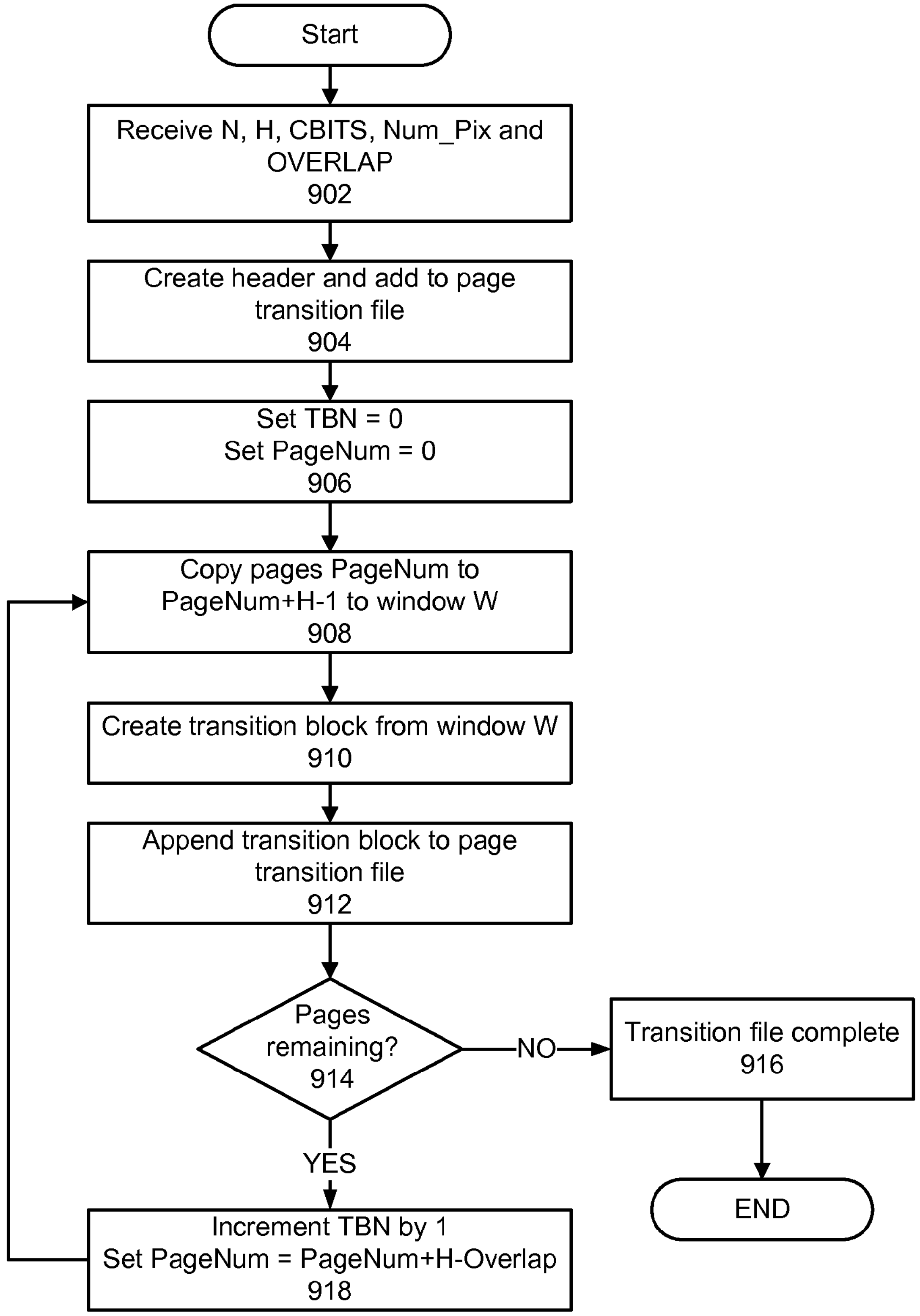
FIG. 9 is a flow chart of a method for creating page transition file for a document according to an embodiment of the invention.

FIG. 9 illustrates a method for creating page transition file 400 for a document according to some embodiments. The creation module 528 in page transition block determination module 507 receives 902 N, H, CBITS, Num_Pix and an OVERLAP; creates 904 a header 402 populated with the received information; and adds 904 the header 402 to the page transition file 400. In one embodiment, the creation module 528 receives the page width and height in pixels and writes these two values to page transition file header 402 instead of Num_Pix. In another embodiment, values for one or more of N, width, height and Num_Pix are automatically determined by examination of the document file (e.g. from page count and default resolution information stored in the document header). OVERLAP is a variable representing the number of pages that should be duplicated from a previous to a next transition block to enable pseudo double buffering. In one embodiment, creation module 528 also receives one or more of page transition speed and page transition direction to be supported by the page transition file 400 from the image buffer feeding module 605. In this embodiment, the creation module 528 also adds the received page transition speed and/or page transition direction to header 402. The creation module 528 then initializes the sliding window image buffer 522 and creates a sliding window W with consecutive pages of the document, starting with the first page of the document. In one embodiment, the sliding window W includes data representing H pages. In another embodiment, the sliding window W includes pointers to the data representing H pages. When the sliding window W includes pointers, the creation module 528 uses these pointers to access the data representing the H pages. For the embodiments shown in FIGS. 3A, 4 and 8, H is equal to eight and CBITS is equal to one. For the embodiment shown in FIG. 3B, H is equal to four and CBITS is equal to two. For the embodiment shown in FIG. 4, OVERLAP is equal to two.

The method then sets 906 the transition block number (TBN) equal to zero. The method also sets 906 a variable, PageNum, equal to 0. This indicates that additional pages of the document that need to be processed would begin with a page number equal to the value of the variable PageNum (with the page number of the first page in the document designated as page zero). Next, in step 908, the image buffer feeding module 505 copies pages to the sliding window image buffer 522. In particular, pages PageNum to PageNum+H−1 are copied to window W. For example, where PageNum is zero and H=8, this copies the first eight pages into the window W. If fewer than H pages remain in the document, all remaining pages are copied into W and any remaining slots in W after those pages are left empty. Next, the process creates 910 a transition block 404 from original document pages stored in window W. The process for creating a transition block 404 will be described in more detail below with reference to FIGS. 10A and 10B. Once the transition block 404 has been created, it is appended 912 to the end of the page transition file 400. Next the creation module 528 determines 914 whether there are any remaining pages of the document. If not, the page transition file 400 is complete 916 and the method ends. However, if there are additional pages of the document that have not been processed by the page transition block determination module 507, the method continues in step 918. Next the method increments 918 the transition block number (TBN) by one, and sets the variable PageNum equal to PageNum plus H minus OVERLAP. For example, if PageNum=0, H=8 and OVERLAP=2, PageNum would be set to 6, indicating that the next page transition block 404 to be written should start with the page with page number 6 (again, assuming the first page in the document has page number zero). The process then repeats for subsequent page transition blocks, starting by copying 908 a new set of pages into W.

Figure 10A:
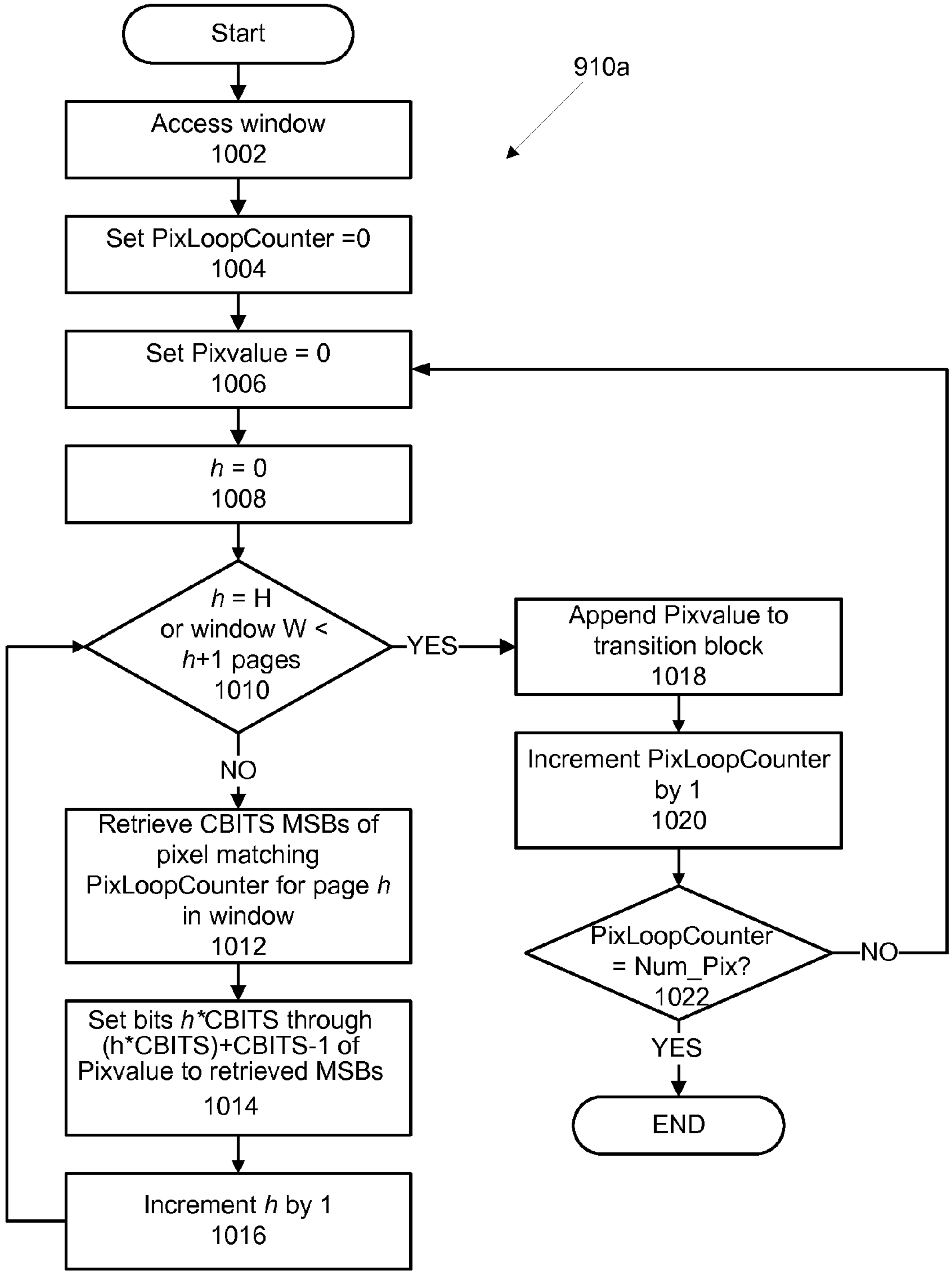
FIGS. 10A and 10B are a flow chart of a method for creating a page transition block according to embodiments of the present invention.
Figure 10B:
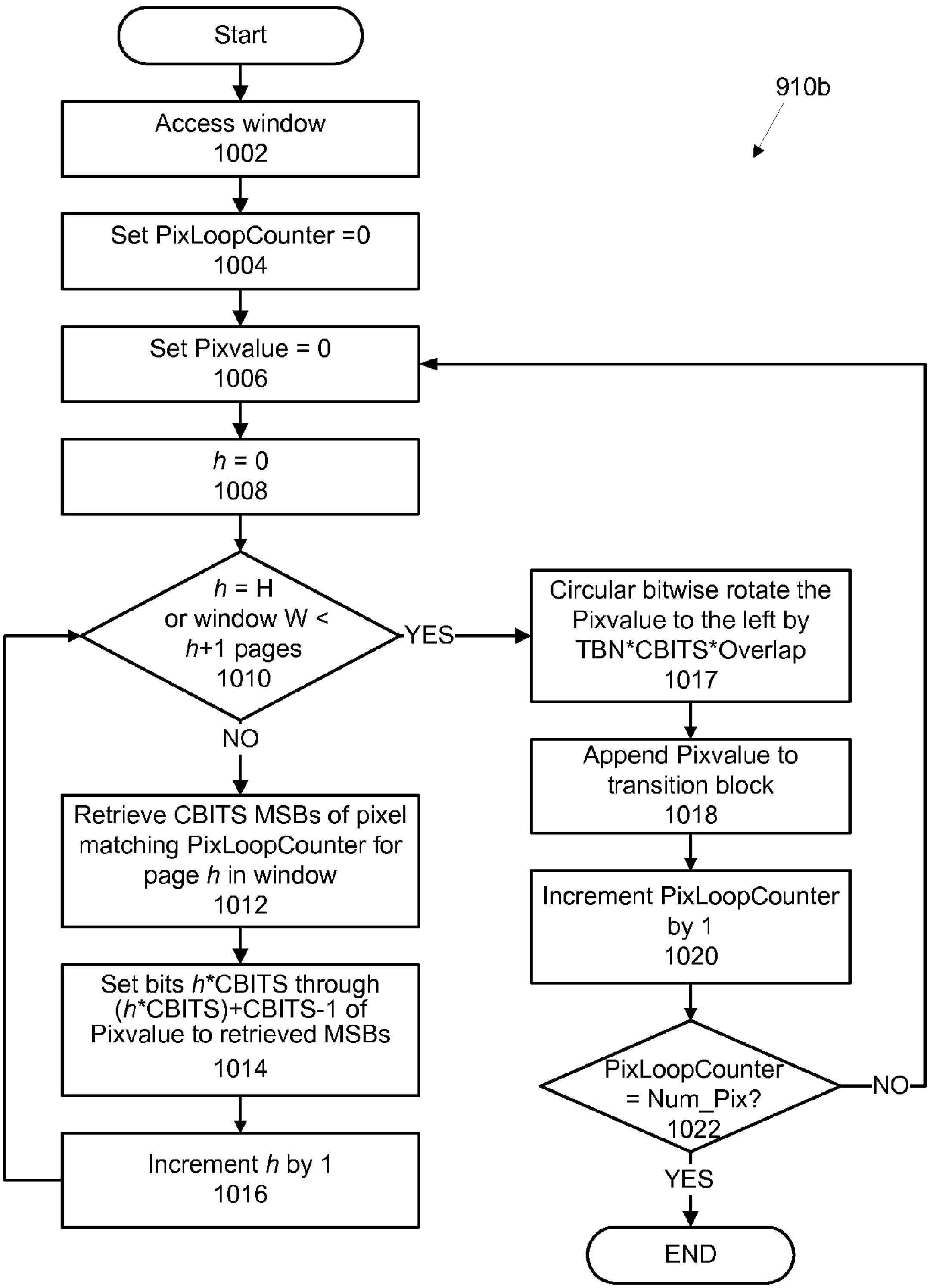

Referring now to FIGS. 10A and 10B, a method for creating a page transition block 404 according to embodiments of the present invention will be described.

FIG. 10A shows a method 910*a* for creating the page transition block 404 without pseudo double buffering but where each pixel is packed to include transitions between more than two pages. Without double buffering, pages are encoded within a transition pixel in page order, with lowest page number occupying the leftmost (most significant) bits. Note that even when not using pseudo double buffering, the value of OVERLAP should still be set to 1 and not 0. That insures that the transition from the highest page encoded in a page transition block 404 to the next highest page is still encoded in a page transition block 404. For the purposes of the description below, the method assumes that H number of pages will be represented by each packed transition pixel, with CBITS bits devoted to encoding the pixel color from each page. The method begins by with the creation module 528 accessing 1002 the window W. Next, the creation module 528 sets 1004 the variable PixLoopCounter to zero. The variable PixLoopCounter is used to track the pixel position of processing and has a possible value of from zero to Num_Pix. Then method sets 1006 the variable Pixvalue to 0. Pixvalue is a variable (CBITS*H) bits in length that temporarily stores transition bits until the entire packed transition pixel has been created. In step 1008, the variable h is set to 0. The variable h is used as an index into window W to track which page in the window is being processed, with index 0 in window W being the lowest-numbered page in W, index 1 being the second lowest-numbered page, etc. Then the creation module 528 then determines 1010 whether the value of the variable h is equal to the variable H or window W contains fewer than h+1 pages (as might be the case when processing the last few pages of a document). If neither condition is met, the packed transition pixel is not complete and the method proceeds to perform steps 1102-1106 which generates transition pixels and adds them to the variable Pixvalue. The process of producing a packed transition pixel starts by retrieving 1012 the most significant bits of the pixel from the appropriate page in window W. In particular, the method retrieves 1012 the CBITS most significant bits of the pixel matching PixLoopCounter for the page found at index h in the window W. Then the method adds 1014 these retrieved bits to the value of Pixvalue. Specifically, the method sets 1014 bits h*CBITS through (h*CBITS)+CBITS −1 of the Pixvalue to the retrieved MSBs. Then the value of variable h is incremented 1016 by one after which the method loops back to step 1010 to determine if the packed transition pixel is complete. By looping through steps 1012 to 1016, the method of the present invention adds pixels to the packed transition pixel until it has been created.

If in step 1010 the method determined that variable h is equal to the variable H, then the packed transitional pixel has been created and the Pixvalue is appended 1018 to the page transition block 404. The method continues by incrementing 1020 the PixLoopCounter by one. Next method determines 1022 whether all the pixels for the pages have been processed. In particular, the method determines 1022 whether the value of the variable PixLoopCounter is equal to the value of the variable Num_Pix. If not, there are additional pixels for the pages that need to be processed and the method returns to step 1006 to create the next packed transition pixel of the page. If so, the page transition block 404 is complete and the method ends.

Referring now to FIG. 10B, a method 910*b* for creating the page transition block 404 with pseudo double buffering will be described. The method for creating the page transition block 404 with pseudo buffering includes many of the same or similar steps as those described above with reference to FIG. 10A. Therefore, FIG. 10B uses the same reference numbers to refer to steps with the same or similar functionality.

The method 910*b* begins by accessing 1002 the window and setting 1004 the variable PixLoopCounter to zero, setting 1006 Pixvalue to 0 and setting 1008 h to 0 as has been described above. The method then performs the step of determining 1010 whether the packed transition pixel is complete and generating bits of the packed transition pixel in steps 1012 to 1016 as has been described above. If the method determines 1010 that the packed pixel is complete, the method then transitions to step 1017. In step 1017, the method performs a circular bitwise rotate of the variable Pixvalue to the left by TBN*CBITS*OVERLAP. This produces the ordering of bits necessary for pseudo double buffering that has been described above with reference to FIG. 4C. After step 1017, the method continues to perform the steps 1018 to 1022 as has been described above. The use of pseudo double buffering is particularly advantageous because it allows copying of a page transition block 404 to frame buffer 610 anytime during a page transition without so-called "tearing" visual artifacts.

Figure 11A:
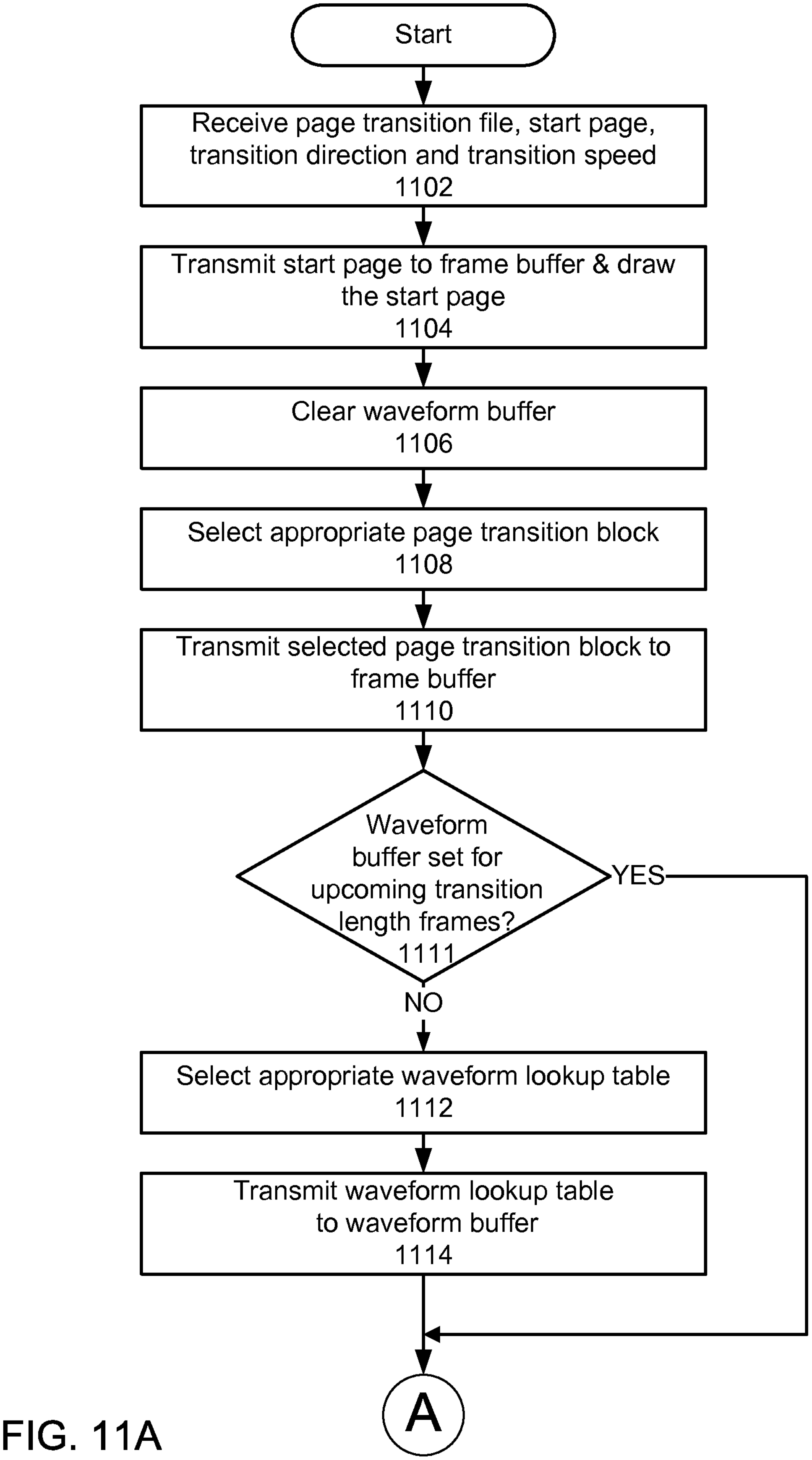
FIGS. 11A and 11B are a flow chart of a method for updating the frame buffer and the waveform buffer as the user selects a start page, transition direction and transition speed on an end user application according to an embodiment of the present invention.
Figure 11B:
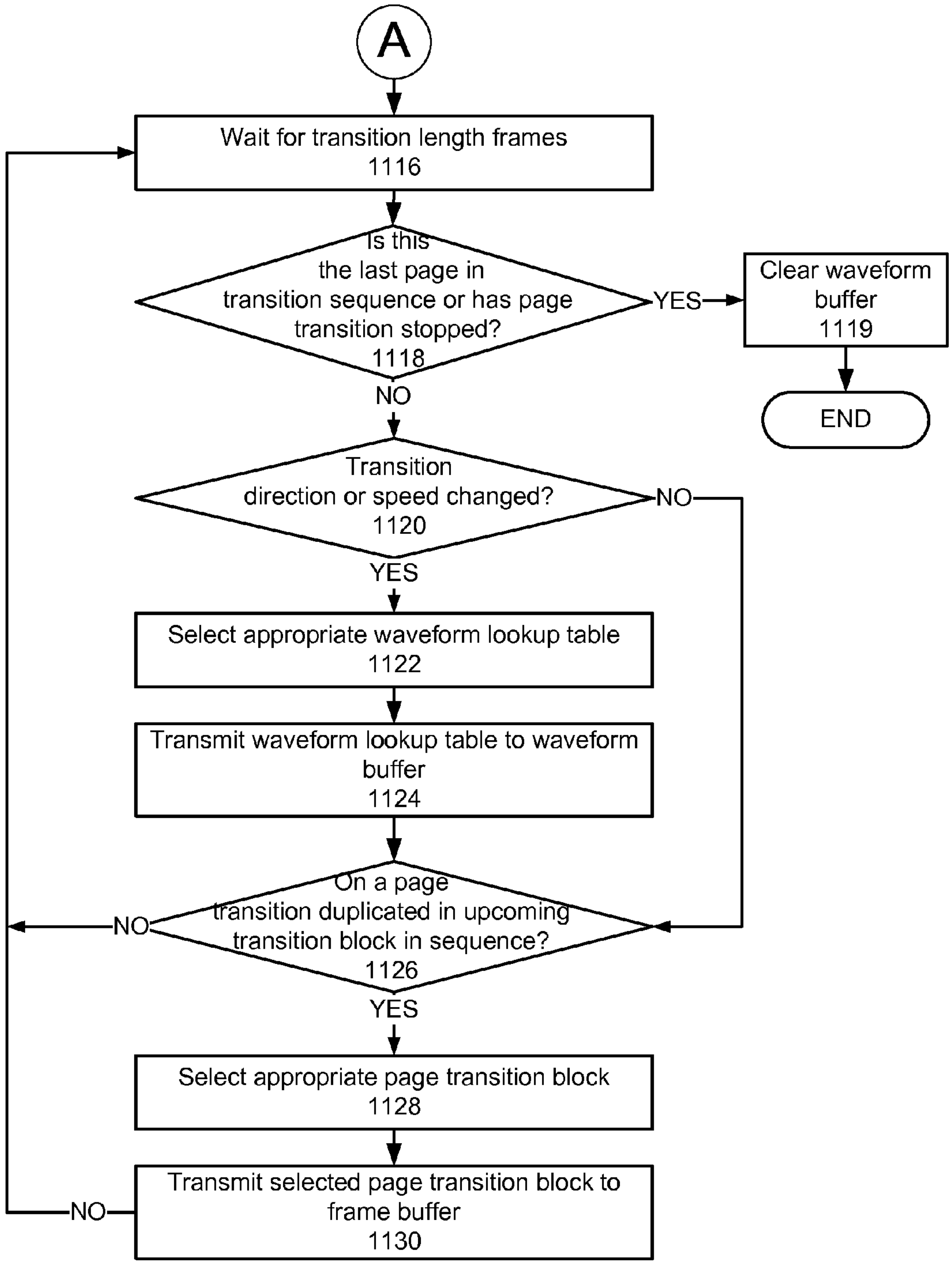

Referring now to FIGS. 11A and 11B, a method for updating the frame buffer 610 and waveform buffer 608 will be described. As shown in FIG. 11A, the method begins with the update controller 606 receiving 1102 a page transition file, a start page, a transition direction and a transition speed. This information is required to determine the page transition block 404 to copy. Then the start page is transmitted 1104 to the frame buffer 610 and the display controller 612 draws the start page. In other words, the system 100 displays a version of the starting page with CBITS color resolution in the normal way, and waits until the display is fully updated. Additionally, normal updates are disabled until page flipping is completed. Next, the waveform buffer 608 is cleared 1106 by the update controller 606. This ensures that the display controller 612 does not draw anything while the first transition block 404*a* is being copied to the frame buffer 610. Then the update controller 606 selects 1108 an appropriate page transition block 404 based on the components received in step 1102. Specifically, the update controller 606 selects 1108 the page transition block 404 that includes start page. If two page transition blocks 404 both contain start page (because start page is one of the duplicated pages due to OVERLAP) then the latter of the two page transition blocks 404 is selected when flipping in a forward direction, and the earlier of the two is selected when flipping backwards. The update controller 606 then transmits 1110 the selected page transition block 404 to the frame buffer 610, and the frame buffer 610 stores the selected page transition block 404. Starting at the upcoming frame number, the repeating waveform is written to the end of waveform buffer 608 and then wrapped around such that it continues until the frame number preceding the current frame. This enables the display controller 612 to start updating starting at frame 0 after it reaches the last frame of waveform buffer 608, and to continue looping through waveform buffer 608 so long as updates are still required. By filling future frames of waveform buffer 608 whenever display controller 612 is about to reach the end of those that were previously written, the waveform buffer 608 can be considered as being an infinitely long waveform lookup table. In step 1111, the method determines whether the waveform buffer 608 is already set for upcoming transition length frames. If so, the method transitions to step 1116 as will be described below. If not, the update controller 606 next selects 1112 the appropriate waveform lookup table 1112 based on the components received in step 1102. The update controller 606 transmits 1114 the selected waveform lookup table to the waveform buffer 608, and waveform buffer 608 stores the selected waveform lookup table. This includes aligning the waveform so drawing of the appropriate transition starts on the upcoming frame. In other words, the update controller 606 generates waveforms representing the requested page transition speed and direction, and writes them to a waveform table such that they are aligned to match the positions with the pages in the current transition block. For example, if starting at page 20 of the document (bit position 4 of block three of FIG. 4C, with H=8, CBITS=1 and OVERLAP=2) the repeating waveforms will be written starting with the transition from bit four to bit five starting on the upcoming frame. Once started, the display controller 612 automatically starts transitioning the display through a sequence of pages. The update controller 606 tracks which page is currently being displayed by counting the number of frames that have passed since the last transition block was copied.

Referring now to FIG. 11B, the method continues to wait 1116 for transition length of frames. For example, as shown in FIG. 8B, this would be three frames. Next the method determines 1118 if the last page in the transition sequence has been displayed or the page transition has stopped, where transition sequence is the sequence of pages to be displayed. It should be noted that if the transition direction is forward, step 1118 tests for the last page in the transition sequence, but if the transition direction is backwards, step 1118 tests for the first page in the transition sequence. If either of the conditions in step 1118 is true, the waveform buffer 608 is cleared 1119 to prevent unintended updates to the display caused by previously-written waveforms and then the method is complete and ends. However, if both conditions in step 1118 are not true then the method continues to determine 1120 whether the transition direction or speed has changed. If not, the method proceeds and continues in step 1126. However, if either the transition direction of the speed is changed, the waveforms must be recalculated. In step 1122, the update controller 606 selects an appropriate waveform lookup table based upon the new direction and speed. Then the update controller 606 transmits 1124 the waveform lookup table to the waveform buffer 608, and the waveform buffer 608 stores the new waveform lookup table. As noted above, this includes aligning the waveform table so that drawing of the appropriate transition starts on the upcoming frame. In step 1126, the update controller 606 determines whether the page transition currently being processed by the display controller 612 is duplicated in the upcoming page transition block 404. If not the process is in the same page transition block 404 and loops back to step 1116. However, if the page transition that the update controller 606 is currently on is duplicated in the next transition block 404, the method proceeds to select 1128 the appropriate page transition block 404. If the transition is in the forward direction, this is the next page transition block 404 in the page transition file 400 or if the transition is in the backward direction this is the previous page transition block 404 in the page transition file 400. The update controller 606 then transmits 1130 the selected page transition block 404 to the frame buffer 610, and stores the selected page transition block 404 in the frame buffer 610. After step 1130, the method loops back to step 1116 and continues processing of the transition block 404.

Figure 12:
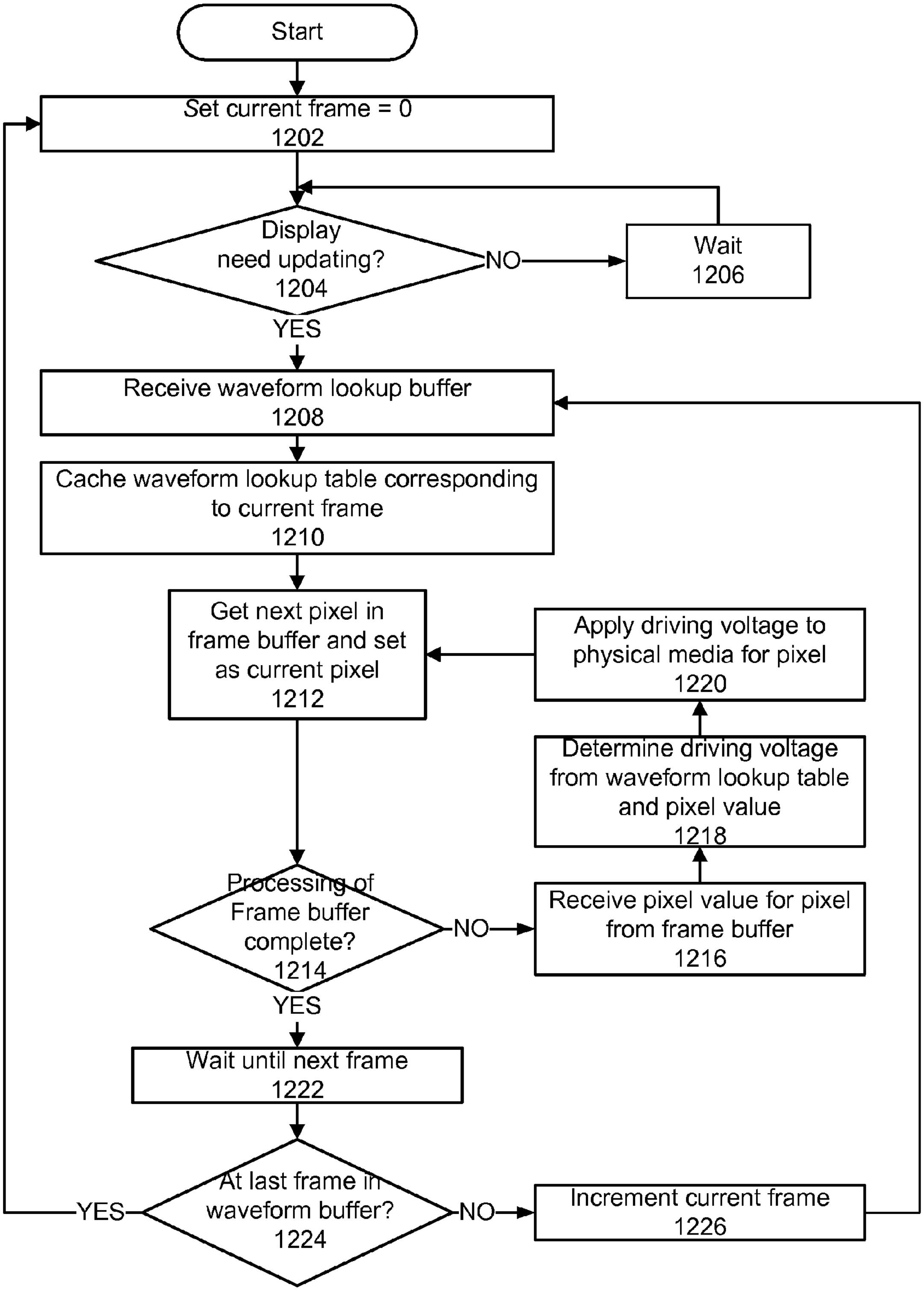
FIG. 12 is a flow chart of a method for updating physical media to display page transitions according to an embodiment of the invention.

Referring now to FIG. 12, a method for updating physical media 120 to display page transitions according to an embodiment of the invention will be described. FIG. 12 illustrates a method for updating physical media 120 to display page transitions. The appropriate waveform lookup table and page transition block 404 have been stored in the waveform buffer 608 and the frame buffer 610 as described above with reference to FIGS. 11A and 11B. The method begins by setting 1202 the current frame value equal to zero. Then the method determines 1204 whether display needs updating. If not, the method waits 1206 a predetermined amount time before again checking in step 1204 whether display needs to be updated. The method loops through steps 1204 and 1206 until the display needs to be updated. If it is determined in step 1204 that the display needs to be updated the method proceeds to receive 1208 waveform tables in the waveform buffer 608. Next the method caches 1210 the waveform lookup table corresponding to the current frame. Then in steps 1212 through 1220 to the display controller 612 updates the display for each pixel in the frame buffer 610. In particular, the display controller 612 gets 1212 the next pixel in the frame buffer 610 and sets it as the current pixel. Next, the method determines 1214 whether all of the pixels in the frame buffer 610 have been processed. If not, the method continues by retrieving 1216 the pixel value for the current pixel from the frame buffer 610. Then the display controller 612 determines 1218 a driving voltage from the waveform lookup table and the pixel value. Then the display controller 612 applies 12208 driving voltage to the physical media 120 for the pixel. After step 1220 the method returns to step 1212 to get the next pixel in the frame buffer. After all of the pixels in the frame buffer have been processed, the method continues by waiting 1222 for the beginning of the next frame. Then the display controller determines 1224 whether the last frame in the waveform buffer has been reached. If not, the display controller 612 increments 1226 the current frame and returns to step 1208 to receive the waveform lookup buffer. If however the last frame in the waveform buffer has been reached, the method returns to step 1202 to set the current frame back to zero. After the page transitions have been displayed, the display controller 612 may re-display the last page shown using waveforms that remove ghosting artifacts, according to prior art methods.

Referring now to FIGS. 8A and 8D-8H an example of drawing the characters "RICOH[space]CRC[space]" on successive pages using the above described system and method will be described. FIGS. 8A and 8D-8H show visual representations of the waveform buffer 608, the frame buffer 610, the physical media 120, and portions of the page transition file 400 at different times in the process of displaying according to an embodiment of the present invention. The figures also show a copy of pseudo double buffering table 410 shown in FIG. 4C as an abstract representation of the page bit ordering in different transition blocks 404 in page transition file 400, and in FIGS. 8D-8H to highlight which page transition is currently being rendered to the display. In particular, the page transition file 400 is meant to represent a current page transition block 802 and a next page transition block 804. In the example, the direction is forward, speed is 3 frames per page, H=8, CBITS=1, OVERLAP=2, N is 10 and the display is 7 pixels wide by 7 pixels high (and thus Num_Pixels is 49).

FIG. 8A shows the waveform buffer 608, the frame buffer 610, the physical media 120, portions of the page transition file 400 (the current page transition block 802 and the next page transition block 804) just after the start page has been drawn by the display controller 612, the first page transition block 404 has been copied to the frame buffer 610, the waveform table has been generated and copied to the waveform buffer 608 for the desired direct and speed, and aligned so the transition from the start page (page 0) is in the upcoming frame. FIG. 8A also shows the pseudo double buffering table 410 for convenience and ease of understanding. It should be noted that in this example the waveform table is written to the waveform buffer 608 in Frame 2 and thus the waveforms begin to be in use by the display controller 612 in frame 3.

FIG. 8D shows the waveform buffer 608, the frame buffer 610, the physical media 120, portions of the page transition file 400 (the current page transition block 802 and the next page transition block 804) and the pseudo double buffering table 410 to show the relationship between each of them for a given pixel. FIG. 8D shows the state of these components as of time of Frame 3 830. For example, the highlighted pixel 810 stored in the frame buffer 610 is the index with a value of 74 (in hexadecimal). The index is the same as in the current page transition block 802 since the current page transition block 802 has been copied into the frame buffer. The index is used by the display controller 612 to access a waveform 812 stored in the waveform buffer 608. This index, 74 corresponds to the waveform 812. The display controller 612 then applies the waveform to the pixel 814 on the physical media 120 to change the appearance of pixel 814. The relationship of this transition to the packed transition pixel is shown by the highlighted bits 816 of the pseudo double buffering table 410, which in FIG. 8D shows the system has started performing the transition from page 0 ("R") to page 1 ("I").

Comparing FIGS. 8D and 8E show the difference after 16 frames. As can be seen in FIG. 8E, the display controller 612 has now reached frame 20 818. For the highlighted pixel 810 stored in the frame buffer 610, the index value continues to be 74, and waveform 812 is the same. The pixel 814 on the physical media 120 has the same state, though over the course of those 18 frames it first transitioned to white during frames 3-5, then remained for frames 6-11, then transitioned back to black over frames 12-14, then back to white over frames 15-17, and finally transitioned back to black for frames 18-20. The relationship of this transition to the packed transition pixel is shown by the highlighted bits 816 of the pseudo double buffering table 410. As can be seen we are near the end of the first transition block 0 (row 0 of table 410), and have just completed the transition from page 5 to page 6.

FIGS. 8F and 8G show the state of the waveform buffer 608, the frame buffer 610, the physical media 120, portions of the page transition file 400 (the current page transition block 802 and the next page transition block 804) and the pseudo double buffering table 410 at frame 21 826. In particular, the effect of pseudo double buffering is shown by comparing these figures. As shown in FIG. 8F, the corner pixel of the frame buffer 610 has a value of 74. This portion of the waveform is highlighted by block 824. As can be seen, the index with a value of 7C has the same values in entries for frames 21-23 in waveform buffer 608 as highlighted by block 822. This will also necessarily be the case for every other pair of pixel values that share a common location in page transition block 802 and 804 respectively (e.g. 7E and F0, or AD and 7E). This is because pixels in both blocks encode the same page values (here, pages 6 and 7) in their overlapping regions (here, the two right-most bits), and frames 21-23 of waveform buffer 608 encode the transition between the pages in this overlapping region. Sometime during the duplicated page transition from page 6 to page 7, the values for the transition block 804 are copied into the frame buffer 610 as reflected by the differences in values between FIGS. 8F and 8G. As indicated by the pseudo double buffering table 410, the system has shifted from updating the display with the highest page transition encoded in the first page transition block 802 (page 6 to page 7, occupying the two right-most bits of each packed pixel) to updating the display with the lowest page transition encoded in the second page transition block 804 (also page 6 to page 7, also occupying the two right-most bits of each packed pixel). Since the display controller 612 updates the physical media 112 in parallel to with transition block 804 being copied 1130 into frame buffer 610, it is possible that while the copy is being performed some pixels in the display will be updated based on the pixel value from page transition block 802 while other pixels will be updated based on the pixel value from page transition block 804. Insuring that all pixels be updated from the same block would require precise timing and fast memory copies, but because page values are duplicated across pixel pairs for the frames in question each pixel in the physical media 112 will be driven the same regardless of whether its value was taken from the previous page transition block 802 or next page transition block 804.

FIG. 8H shows the difference when the display controller 612 has reached frame 29 830. As can be seen in FIG. 8H, the frame buffer 610 includes the same transition block since we are still in transition block 1. The physical media 120 is white after the application of waveforms (corresponding to the second [space] in our example text). The waveform buffer 608 continues to store the same waveforms as in FIG. 8G (though these will subsequently be cleared). The display controller 612 has wrapped around in transition block 1 after 3 frames for the two least significant bits (page 6 to page 7) and 3 frames for a transition between the least significant bit and the most significant bit of transition block 1 (page 7 to page 8), and the display controller 612 is just completing processing the transition between the two most significant bits (pages 8 and 9) as shown by the highlighted block 834.

The invention claimed is:

1. A system for creating a page transition file from a document having a plurality of pages, the system comprising:

an image buffer feeding module for receiving the document and transmitting the plurality of pages of the document;

a sliding window image buffer, communicatively coupled to the image buffer feeding module, for receiving the plurality of pages of the document from the image buffer feeding module wherein the received plurality of pages comprise data representing the plurality of pages or pointers to the data, the sliding window image buffer for storing the received plurality of pages;

a creation module, communicatively coupled to the sliding window image buffer, for creating the page transition file from the plurality of pages stored in the sliding window image buffer, the page transition file comprising a header representing data associated with the document and a plurality of page transition blocks, each page transition block representing a transition through at least three pages of the document including at least two overlapping pages of the document from a previous page transition block and at least two overlapping pages of the document from a next page transition block and having a plurality of packed page transition pixels; and a storage for storing the page transition file created by the creation module.

2. The system of claim 1 wherein the plurality of packed page transition pixels each represent 8 pages with one bit per page.

3. The system of claim 1 wherein the plurality of packed page transition pixels each represent 4 pages with 2 bits per page.

4. The system of claim 1 wherein each of the plurality of packed page transition pixels includes bits from a first packed page transition pixel in the previous page transition block and bits from a second packed page transition pixel in the next page transition block and maintains the bit positions from the previous page transition block and the next page transition block.

5. A page transition display system for displaying page transitions on an electronic paper display, the system comprising:

a frame buffer for receiving and storing page transition blocks;

a waveform buffer for receiving and storing waveforms;

an update controller for receiving a page transition file, the page transition file comprising a header representing data associated with a document and including a plurality of page transition blocks, each page transition block representing a transition through at least three pages of the document including at least two overlapping pages of the document from a previous page transition block and at least two overlapping pages of the document from a next page transition block and having a plurality of packed page transition pixels, the update controller communicatively coupled to the frame buffer and the waveform buffer and coupled to receive the page transition file, the update controller selecting an appropriate page transition block from the page transition file and storing the selected page transition block in the frame buffer, the update controller generating a waveform look up table and storing the waveform look up table in the waveform buffer; and a display controller, communicatively coupled to the frame buffer, the waveform buffer and a physical media of the electronic paper display, for determining a desired driving voltage from the waveform buffer based on a current transition pixel from the current page transition block in the frame buffer and for applying the desired driving voltage to the physical media of the electronic paper display.

6. The system of claim 5 wherein the update controller includes a waveform determination module for generating a waveform lookup table on the fly and storing the waveform lookup table in the waveform buffer.

7. The system of claim 5 wherein the plurality of packed page transition pixels each represent 8 pages with one bit per page.

8. The system of claim 5 wherein the plurality of packed page transition pixels each represent 4 pages with 2 bits per page.

9. The system of claim 5 wherein each of the plurality of packed page transition pixels includes bits from a first packed page transition pixel in the previous page transition block and bits from a second packed page transition pixel in the next page transition block and maintains the bit positions from the previous page transition block and the next page transition block.

10. The system of claim 5 wherein the update controller includes a frame buffer content controller communicatively coupled to receive page transition blocks and store them in the frame buffer, the frame buffer content controller coupled to the frame buffer; and a frame buffer timing controller to determine a time at which a page transition block can be written to the frame buffer, the frame buffer timing controller coupled to the buffer content controller.

11. A method for creating a page transition file from a document having a plurality of pages, the method comprising:

receiving, by a sliding window image buffer from an image buffer feeding module, the plurality of pages in the document wherein the received plurality of pages comprise data representing the plurality of pages or pointers to the data;

storing, by the sliding window image buffer, the received plurality of pages;

creating, by a creation module, the page transition file from the stored plurality of pages, the page transition file comprising a header representing data associated with the document and a plurality of page transition blocks, each page transition block representing a transition through at least three pages of the document including at least two overlapping pages of the document from a previous page transition block and at least two overlapping pages of the document from a next page transition block and having a plurality of packed page transition pixels; and storing, by the creation module on a storage, the page transition file.

12. The method of claim 11 wherein the plurality of packed page transition pixels each represent 8 pages with one bit per page.

13. The method of claim 11 wherein the plurality of packed page transition pixels each represent 4 pages with 2 bits per page.

14. The method of claim 11 wherein each of the plurality of packed page transition pixels includes bits from a first packed page transition pixel in the previous page transition block and bits from a second packed page transition pixel in the next page transition block and maintains the bit positions from the previous page transition block and the next page transition block.

15. A method for displaying page transitions on an electronic paper display, the method comprising:

receiving a start page, a transition direction and a transition speed;

receiving a page transition file, the page transition file comprising a header representing data associated with a document and including a plurality of page transition blocks, each page transition block representing a transition through at least three pages of the document including at least two overlapping pages of the document from a previous page transition block and at least two overlapping pages of the document from a next page transition block and having a plurality of packed transition pixels;

selecting an appropriate page transition block;

storing the selected page transition block in the frame buffer;

selecting an appropriate waveform;

storing the selected waveform in the waveform buffer; and using the selected page transition block in the frame buffer by a display controller to determine an identified waveform in the waveform buffer; and applying by the display controller a desired driving voltage from the identified waveform to a pixel on a physical media.

16. The method of claim 15 wherein selecting an appropriate waveform includes generating a waveform lookup table on the fly and storing the selected waveform includes storing the waveform lookup table in the waveform buffer.

17. The method of claim 15 wherein the selected page transition block comprises a plurality of packed page transition pixels, the plurality of packed page transition pixels being indices to corresponding waveforms in the waveform buffer.

18. The method of claim 17 wherein the plurality of packed page transition pixels each represent 8 pages with one bit per page.

19. The method of claim 17 wherein the plurality of packed page transition pixels each represent 4 pages with 2 bits per page.

20. The method of claim 17 wherein each of the plurality of packed page transition pixels includes bits from a first packed page transition pixel in the previous page transition block and bits from a second packed page transition pixel in the next page transition block and maintains the bit positions from the previous page transition block and the next page transition block.

* * * * *